(12) United States Patent
Gnessin et al.

(10) Patent No.: US 9,309,898 B2
(45) Date of Patent: Apr. 12, 2016

(54) MULTI-FLUID PRECISION CALIBRATION PRESSURE SOURCE

(71) Applicant: King Nutronics Corporation, Woodland Hills, CA (US)

(72) Inventors: Amir Gnessin, Woodland Hills, CA (US); Robert T Welther, Woodland Hills, CA (US)

(73) Assignee: King Nutronics Corporation, Woodland Hills, CA (US)

( * ) Notice: Subject to any disclaimer, the term of this patent is extended or adjusted under 35 U.S.C. 154(b) by 289 days.

(21) Appl. No.: 13/771,006

(22) Filed: Feb. 19, 2013

(65) Prior Publication Data

US 2013/0213505 A1    Aug. 22, 2013

Related U.S. Application Data

(60) Provisional application No. 61/601,872, filed on Feb. 22, 2012.

(51) Int. Cl.
*G01L 27/00*      (2006.01)
*F04F 1/00*      (2006.01)

(52) U.S. Cl.
CPC ............. *F04F 1/00* (2013.01); *G01L 27/005* (2013.01); *Y10T 137/86083* (2015.04)

(58) Field of Classification Search
CPC .. F16J 15/32; F16K 11/0712; F16K 11/0716; F16K 27/041; F15B 13/0402
USPC ................ 73/1.57–1.58; 137/565.23, 565.25, 137/565.01, 565.12, 625.69, 325.28, 165.69
See application file for complete search history.

(56) References Cited

U.S. PATENT DOCUMENTS

| | | | |
|---|---|---|---|
| 2,737,961 A | | 3/1956 | Buckley |
| 3,418,002 A | * | 12/1968 | Hennells ................ 277/584 |
| 3,436,955 A | | 4/1969 | Wilcher |
| 3,481,203 A | | 12/1969 | Ackerman et al. |
| 3,600,536 A | | 8/1971 | Kothe |
| 3,720,090 A | | 3/1973 | Halpert et al. |
| 3,818,926 A | | 6/1974 | Wohlwend |
| 3,845,265 A | | 10/1974 | Kothe |
| 3,880,008 A | | 4/1975 | Eilersen |
| 4,030,365 A | | 6/1977 | Phillips et al. |
| 4,042,149 A | | 8/1977 | Main |

(Continued)

FOREIGN PATENT DOCUMENTS

WO    WO 99/22139    5/1999

OTHER PUBLICATIONS

Druck PV 411A User Manual.

(Continued)

*Primary Examiner* — Peter Macchiarolo
*Assistant Examiner* — Anthony W Megna Fuentes
(74) *Attorney, Agent, or Firm* — Knobbe, Martens, Olson & Bear, LLP

(57) ABSTRACT

A pressure calibration device can include certain features that allow it to be used with a variety of hydraulic and pneumatic systems. A pressure calibration device can be configured to provide pressure or vacuum, and can have a mode selector for selecting to provide pressure or vacuum. A pressure calibration device can have a volume adjuster configured to modify pressures for hydraulic or pneumatic systems. A pressure calibration device can have a pressure release valve and a bleed valve for adjusting pressure values.

35 Claims, 16 Drawing Sheets

(56) References Cited

U.S. PATENT DOCUMENTS

| | | |
|---|---|---|
| 4,086,804 A | 5/1978 | Ruby |
| 4,209,040 A * | 6/1980 | Peters ............... F16K 31/1221 137/625.26 |
| 4,241,750 A | 12/1980 | Furuse et al. |
| 4,432,230 A | 2/1984 | Stahler et al. |
| 4,648,533 A | 3/1987 | Rasmussen |
| 4,698,998 A | 10/1987 | Varnagy |
| 4,815,313 A | 3/1989 | Beard |
| 4,909,063 A | 3/1990 | Olsen |
| 4,910,682 A | 3/1990 | Wolff et al. |
| 4,938,053 A | 7/1990 | Jepson et al. |
| 5,014,211 A | 5/1991 | Turner et al. |
| 5,108,073 A * | 4/1992 | Adachi ........................ 251/163 |
| 5,257,640 A | 11/1993 | Delajoud |
| 5,324,181 A | 6/1994 | McGoldrick et al. |
| 5,377,524 A | 1/1995 | Wise et al. |
| 5,461,901 A | 10/1995 | Ottestad |
| 5,900,530 A | 5/1999 | O'Brien et al. |
| 6,360,579 B1 | 3/2002 | De Boom et al. |
| 6,505,134 B2 | 1/2003 | Poleshuk et al. |
| 6,778,917 B1 | 8/2004 | Jansen |
| 6,813,925 B2 | 11/2004 | Naumiec et al. |
| 6,830,730 B2 | 12/2004 | Rhodes |
| 7,299,676 B1 | 11/2007 | Mueller et al. |
| 7,379,832 B2 | 5/2008 | Zimmermann et al. |
| 7,441,439 B2 | 10/2008 | Mc Farland et al. |
| D581,950 S | 12/2008 | Ratner |
| 7,572,107 B2 | 8/2009 | Heller et al. |
| 7,762,080 B2 | 7/2010 | Anson et al. |
| 7,821,641 B2 | 10/2010 | Wagner et al. |
| 7,874,195 B2 | 1/2011 | Murnane, Jr. |
| 7,874,196 B2 | 1/2011 | Ratner |
| 8,060,173 B2 | 11/2011 | Goode, Jr. et al. |
| 2003/0221731 A1 * | 12/2003 | Ogura ............... F15B 13/0402 137/625.69 |
| 2005/0103092 A1 | 5/2005 | Chiarito et al. |
| 2008/0022765 A1 | 1/2008 | Witt et al. |
| 2008/0202234 A1 | 8/2008 | O'Neill |

OTHER PUBLICATIONS

Hand Pumps and Digital Test Gauges/Calibrators, pp. 303-309.
Invitation to Pay Additional Fees Report dated Jun. 17, 2013 for PCT Application No. PCT/US2013/026724 filed Feb. 19, 2013, 8 pages.

* cited by examiner

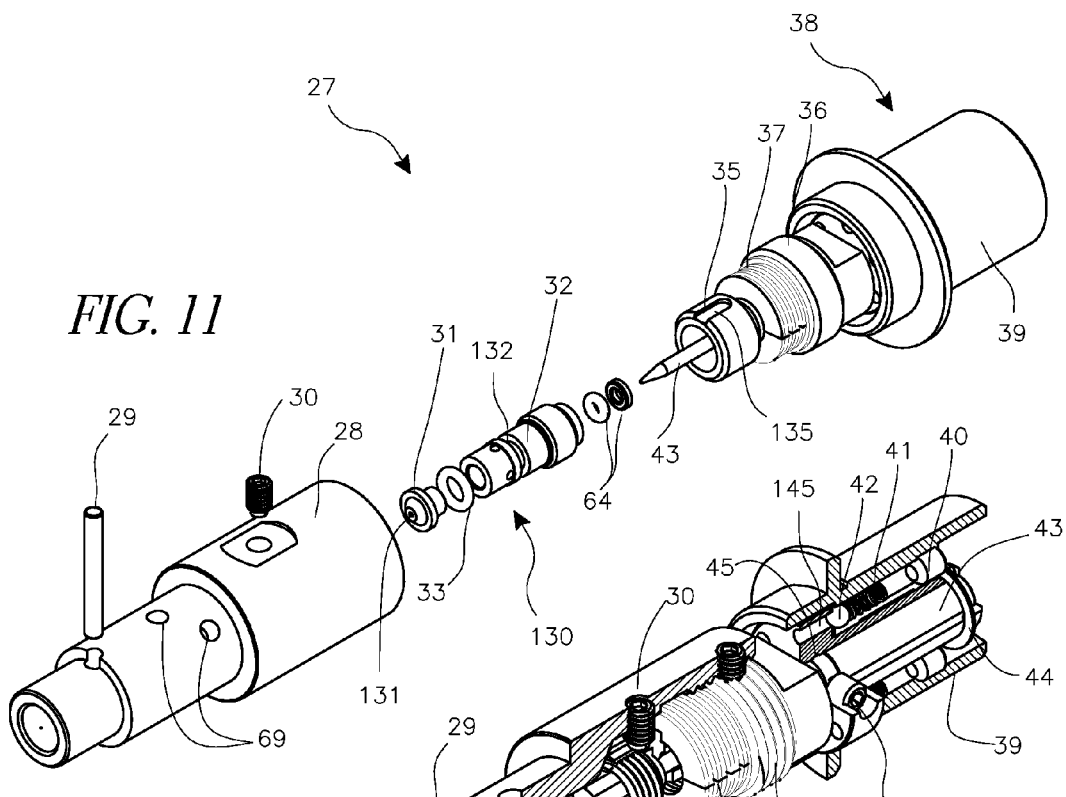
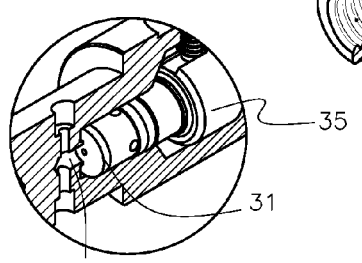
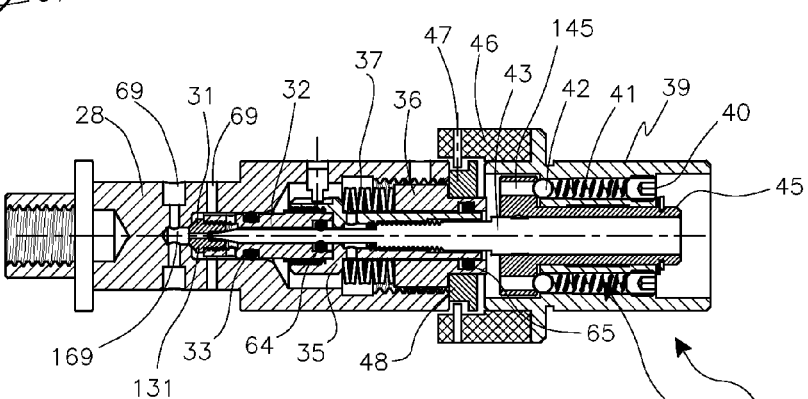

MULTI-FLUID PRECISION CALIBRATION PRESSURE SOURCE

CROSS-REFERENCE TO RELATED APPLICATIONS

This application is related to and claims priority to U.S. Provisional Application No. 61/601,872, filed Feb. 22, 2012, the entire application of which is hereby incorporated by reference and made a part of this specification.

BACKGROUND

1. Field

Various embodiments disclosed herein relate generally to devices and methods for calibrating pressures in systems and devices.

2. Related Art

Current calibration pressure devices use various types of volume adjusters and bleed valves that are usually designed exclusively for either pneumatic or hydraulic applications. Because of the significant different pressure values involved, valves and adjusters that work well in hydraulic applications may not work as well in pneumatic applications and vice versa.

Many current devices do not operate both as a pressure source and as a vacuum source for calibration. Those that do have various limitations and disadvantages.

SUMMARY OF THE DISCLOSURE

Various embodiments described herein address many of the problems found in current calibration pressure devices. For example, many current devices require metal to metal seals in order to block fluid leaks in hydraulic applications, which operate at very high pressures. Such seals require a very large torque to close, making it difficult to fine tune pressure levels, and they quickly bleed gas when opened in a pneumatic application. In various embodiments described herein, a device can have a micro metering bleed valve that can be used for finely controlled release of pressure in both pneumatic and hydraulic applications. A micro metering bleed valve can have delicate components, and in some embodiments a device can have a unidirectional slip clutch that prevents over-tightening of a bleed valve, thereby preventing accidental damage. In some embodiments, a micro metering bleed valve can be combined with a pressure release valve to save space and weight.

Additionally, many calibration pressure devices use check valves to allow for uni-directional flow between a pump chamber and a manifold. Check valves are important components of a calibration pressure device. Because calibration pressure devices frequently operate at high pressures, the seals on check valves are frequently prone to rapid failure. In various embodiments described herein, check valves can have seals, such as O-rings, that attach to a housing of a check valve rather than a poppet of the check valve. This can allow for use of larger O-rings, which decreases the volumetric material deformation of the O-ring, increasing the mean time between failures.

In many calibration pressure devices, volume adjusters are also used to provide controlled pressure modifications. However, in many current devices a volume adjuster that works well for pneumatic applications by making a relatively large volume adjustment requires a significant torque in order to adjust volume in hydraulic applications. Various embodiments described herein help overcome this problem by providing volume adjusters with pistons configured for hydraulic applications and pistons configured for pneumatic applications. In some embodiments, the pistons can be concentrically positioned to minimize space and weight considerations. In various embodiments, the pistons can be controlled independently or together as a single combined piston.

Additionally, current devices that do attempt to provide both vacuum and pressure modes often use metal seals used when switching between vacuum and pressure modes, and the operator must provide a significant torque to switch between modes. Further, in many current devices an operator must rotate a handle many times to switch between modes. Various embodiments described herein have a mode selector valve that allows for an operator to easily rotate a handle a predefined amount, such as 120 degrees, to alternate between vacuum and pressure modes. This can also make it easier for an operator to tell whether a device is configured for vacuum mode or pressure mode.

The various components and assemblies described herein can be used for portable calibration pressure devices, portable calibration pressure devices with hand pumps, and/or non-portable calibration pressure devices. In various embodiments described herein, a portable calibration pressure device can include a pump having an inlet and an outlet, a manifold in fluid communication with the pump, a reservoir in fluid communication with the pump, and a selector valve. The selector valve can include a selector valve housing with a first port configured to fluidly connect to the pump inlet and a second port configured to fluidly connect to the pump outlet; a spool positioned at least partially within the housing and configured to move axially within the housing from a first position to a second position; a plurality of sealing elements positioned within the housing such that when the spool is in the first position the first port is in fluid communication with the reservoir and the second port is in fluid communication with the manifold, and when the spool is in the second position the first port is in fluid communication with the manifold and the second port is in fluid communication with the reservoir; and a cam member mechanically connected to the spool such that rotating the cam member causes the spool to move axially within the housing.

In some embodiments, the cam member can have an angled slot configured to receive a pin that connects to the spool. The cam member can be configured to rotate no more than 360 degrees to move the spool axially from the first position to the second position, and in some embodiments it can rotate approximately 120 degrees to move the spool axially from the first position to the second position. In some embodiments, the sealing rings can be O-rings. In some embodiments, the pump can be a hand pump.

In some embodiments, the selector valve housing can have a third port, a fourth port, and a fifth port in addition to the first and second ports. In some embodiments, when the spool is in the first position the third port can be in fluid communication with the reservoir and can be in fluid communication through the selector valve with the first port, and the fourth port can be in fluid communication with the manifold and can be in fluid communication through the selector valve with the second port. In some embodiments, when the spool is in the second position the fifth port can be in fluid communication with the reservoir and can be in fluid communication through the selector valve with the second port, and the fourth port can be in fluid communication with the manifold and can be in fluid communication through the selector valve with the first port.

In various embodiments described herein, a portable calibration pressure device can include a pump having an inlet and an outlet, a manifold fluidly connected to the pump, a reservoir fluidly connected to the pump, and a selector valve. The selector valve can include a housing having a plurality of ports; a spool positioned at least partially within the housing and configured to move axially within the housing from a first position to a second position, the spool having at least two recessed sections; a plurality of spacer bushings positioned within the selector valve housing such that each port is adjacent a spacer bushing and the spacer bushings adjacent each port comprise at least one radial hole; a plurality of sealing elements configured to seal against an outer diameter of the spool, and at least one sealing element positioned between adjacent spacer bushings; a first fluid volume between a first recessed section of the spool and interior surfaces of the sealing elements and spacer bushings; and a second fluid volume between a second recessed section of the spool and interior surfaces of the sealing elements and spacer bushings. The spool can be located within the housing such that when the spool is in the first position the reservoir fluidly communicates through one of the first and second fluid volume to the pump inlet and the manifold fluidly communicates through the other of the first and second fluid volume to the pump outlet, and when the spool is in the second position the reservoir fluidly communicates through one of the first and second fluid volume to the pump outlet and the manifold fluidly communicates through the other of the first and second fluid volume to the pump inlet.

In some embodiments, the pump can be a hand pump. In some embodiments, the calibration device can also include a cam member mechanically connected to the spool such that rotating the cam member causes the spool to move axially within the housing. The cam member can have an angled slot configured to receive a pin that connects to the spool. The cam member can be configured to rotate no more than 360 degrees to move the spool axially from the first position to the second position, and in some embodiments it can rotate approximately 120 degrees. In some embodiments, the sealing rings can be O-rings. In some embodiments, the sealing elements can remain stationary relative to the selector valve housing when the spool moves from the first position to the second position. In some embodiments, the spacer bushings adjacent each port can comprise at least one radial hole aligned with the port.

In some embodiments, a first port in the selector valve housing fluidly connects to the pump inlet and a second port in the selector valve housing fluidly connects to the pump outlet. In some embodiments, when the spool is in the first position, a third port is in fluid communication with the reservoir and is in fluid communication through the first fluid volume with the first port, and a fourth port is in fluid communication with the manifold and is in fluid communication through the second fluid volume with the second port. In some embodiments, when the spool is in the second position, a fifth port is in fluid communication with the reservoir and is in fluid communication through the second fluid volume with the second port, and the fourth port is in fluid communication with the manifold and is in fluid communication through the first fluid volume with the first port. In some embodiments, the spool can have a third position between the first position and the second position such that when the spool is in the third position the reservoir fluidly communicates through one of the first and second fluid volume with the manifold.

In various embodiments described herein, a portable calibration pressure device can include a pump having an inlet and an outlet, a manifold fluidly connected to the pump, a reservoir fluidly connected to the pump, and a pressure relief valve. The pressure relief valve can include a housing with a first port in fluid communication with the manifold, a second port in fluid communication with the reservoir, and a channel connecting the first port and the second port; a plunger positioned within the housing; a sealing tip with a central lumen attached to a first end of the plunger; a spring element positioned proximate a second end of the plunger and configured to bias the plunger toward a first position in which the plunger pushes a sealing surface of the sealing tip against an opening to the channel, blocking fluid communication between the first port and the second port; a bleed valve needle extending through the plunger and having a distal tip configured to seal within the central lumen of the sealing tip; and a handle assembly with a handle, the handle assembly configured to attach to a proximal end of the bleed valve needle such that rotating the handle in a first direction moves the distal tip of the bleed valve needle into the central lumen of the sealing tip to seal the central lumen and rotating the handle in a second direction moves the distal tip of the bleed valve needle away from the central lumen of the sealing tip.

In some embodiments, the pump can be a hand pump. In some embodiments, the sealing tip can screw into the plunger. In some embodiments, the sealing tip can have a curved distal surface. In some embodiments, the calibration pressure device can include a carrier positioned between the plunger and the handle assembly, and the bleed valve needle can pass through the carrier and threadedly engage the carrier.

In some embodiments, the handle assembly can also include a clutch bushing defining a plurality of holes and positioned within the handle and attached to the proximal end of the bleed valve needle. The handle assembly can also include a plurality of balls within channels in the handle, and each ball can be configured to brace against a hole in the clutch bushing to provide a mechanical connection between the handle and the clutch bushing. The handle assembly can also include a biasing member configured to bias each ball against a respective hole. In some embodiments, an opening to the holes of the clutch bushing can be asymmetrically chamfered.

In various embodiments described herein, a portable calibration pressure device can include a pump, a manifold fluidly connected to the pump, and a volume adjuster. The volume adjuster can have a primary knob with a central bore, at least a portion of which has internal threading; a volume adjuster housing defining a cylindrical cavity, at least a portion of which has external threading engaging the internal threading of the central bore, and having a first port that fluidly connects to the pump and a second port that fluidly connects to the manifold; a primary piston positioned at least partially within the cylindrical cavity and coupled to the primary knob, the primary piston having a central channel; a secondary piston positioned at least partially within the central channel of the primary piston, the secondary piston and primary piston blocking an end of the cylindrical cavity to form a chamber that fluidly communicates with the first port and the second port; and a secondary knob mechanically connected to the secondary piston. Rotating the primary knob can move the primary knob, the primary piston, and the secondary piston relative to the volume adjuster housing. Rotating the secondary knob can move the secondary piston relative to the primary knob, the primary piston, and the volume adjuster housing.

In some embodiments, the pump can be a hand pump. In some embodiments, the secondary knob has a non-circular central bore and a portion of the secondary piston has a non-circular cross section configured to fit within the central bore of the secondary knob. In some embodiments, a hollow plunger can be positioned between the primary piston and the secondary piston. In some embodiments, the secondary piston can have external threading configured to engage internal threading of the hollow plunger. In some embodiments, a cylindrical insert can be positioned between the secondary piston and the hollow plunger. The cylindrical insert can have external threading configured to engage internal threading of the hollow plunger, and can have internal threading configured to engage external threading of the secondary piston.

In some embodiments, the calibration pressure device can include a differential screw with a distal section threadedly connected to an internal bore of the secondary piston, a central section threadedly connected to the central channel of the primary piston, and a proximal section that is mechanically connected to the secondary knob. In some embodiments, the threading on the distal section of the differential screw has a smaller thread diameter than the threading on the central section of the differential screw. In some embodiments, the threading on the distal section of the differential screw has a different pitch than the threading on the central section of the differential screw.

In various embodiments described herein, a portable calibration pressure device can include a pump having an inlet and an outlet, a manifold in fluid communication with the pump, a reservoir in fluid communication with the pump, a mode selector valve configured to selectively move between a first position in which the pump inlet draws fluid from the reservoir and the pump outlet pumps fluid to the manifold, and a second position in which the pump inlet draws fluid from the manifold and pumps fluid to the reservoir, and a pressure relief valve. The pressure relief valve can include a housing with at least a first port in fluid communication with the manifold, a second port in fluid communication with the reservoir, and a channel connecting the first port and the second port; a sealing tip within the pressure relief valve housing, the sealing tip comprising a central lumen; a biasing member biasing the sealing tip against an opening to the channel, blocking fluid communication between the first port and the second port; a bleed valve needle within the pressure relief valve housing, a distal tip of which is configured to enter into and block the central lumen of the sealing tip, and a proximal end of the bleed valve needle attached to a handle, such that rotating the handle in a first direction moves the distal tip of the bleed valve needle into the central lumen of the sealing tip to seal the central lumen and rotating the handle in a second direction moves the distal tip of the bleed valve needle away from the central lumen of the sealing tip.

In some embodiments, the selector valve can include a selector valve housing having a first port configured to fluidly connect to the pump inlet and a second port configured to fluidly connect to the pump outlet; a spool positioned at least partially within the housing and configured to move axially within the housing from a first position to a second position; a plurality of sealing elements positioned within the housing such that when the spool is in the first position the first port is in fluid communication with the reservoir and the second port is in fluid communication with the manifold, and when the spool is in the second position the first port is in fluid communication with the manifold and the second port is in fluid communication with the reservoir; and an actuation member configured to move the spool from the first position to the second position.

In some embodiments, the calibration pressure device can also include a volume adjuster. The volume adjuster can have a housing defining a cylindrical cavity in fluid communication with the manifold; a primary knob positioned around and threadedly connected to at least a portion of the volume adjuster housing; a primary piston positioned at least partially within the cylindrical cavity and mechanically coupled to the primary knob; and a secondary piston positioned at least partially within the primary piston and mechanically coupled to a secondary knob. The primary and secondary pistons can block the cylindrical cavity to form a chamber within the volume adjuster housing. Rotating the primary knob can translate the primary piston and the secondary piston relative to the volume adjuster housing, and rotating the secondary knob can translate the secondary piston relative to the volume adjuster housing.

In some embodiments, a portable calibration pressure device can include a hand pump, a manifold fluidly connected to the pump, and a check valve positioned between the hand pump and the manifold, the check valve configured to allow fluid communication between the manifold and hand pump in only one direction. The check valve can include a check valve housing having a bore with a tapered end, a circumferential groove within a wall of the tapered end, and an O-ring positioned within the groove such that at least a portion of the O-ring extends past the wall of the tapered end. The check valve can also include a poppet movably positioned within the housing, and the poppet can have a first, tapered end and a second end. The check valve can also include a biasing member configured to bias the first end of the poppet into the tapered end of the housing bore, thereby forming a seal between the poppet and the O-ring.

BRIEF DESCRIPTION OF THE DRAWINGS

Throughout the drawings, reference numbers may be reused to indicate correspondence between referenced elements. The drawings are provided to illustrate example embodiments described herein and are not intended to limit the scope of the disclosure.

FIG. 11 is an exploded perspective view of a Pressure Relief Valve and Bleed Valve combination.

FIG. 12 is a perspective sectional view of a Pressure Relief Valve and Bleed Valve combination.

FIG. 13 is a cross section of a Pressure Relief Valve and Bleed Valve combination.

FIG. 14 is a detail view of one embodiment of a Pressure Relief Valve and Bleed Valve combination.

DETAILED DESCRIPTION

In various embodiments described herein, calibration pumps can be used for calibrating pneumatic and hydraulic gauges, switches and other instruments. There are many types of pumps and calibration pressure sources. In some embodiments, the pump can be a hand operated pump suitable for portable applications. In some embodiments, the calibration pumps can combine hydraulic and pneumatic calibration capabilities, providing fine adjustment capabilities for gases and liquids in the same unit and providing pressure adjustment without requiring excessive operator force. This can help allow technicians to carry a single calibration device instead of one device for pneumatic and one device for hydraulic applications.

In various embodiments described herein, calibration pumps can be used as a pressure and/or a vacuum source for calibrating pneumatic and hydraulic gauges, switches and other instruments. These embodiments can also allow a technician to carry a single device for multiple applications. These embodiments can also be useful for calibrating liquid-filled gauges. The vacuum mode can be used to evacuate media from the gauge before calibration, and the pressure mode can be used to calibrate and return media to the gauge. Use of multiple pumps for this purpose can take additional time and increase the risk of spills.

In various embodiments described herein, various components of calibration pumps have been improved to provide better pressure control adjustability of the pumps and to enable accurate pressure and vacuum output during instrumentation calibration. Each of the various components described herein can individually improve pressure control adjustability, and they can also be combined in any combination within a single pump.

Device Overview

Figure 1:
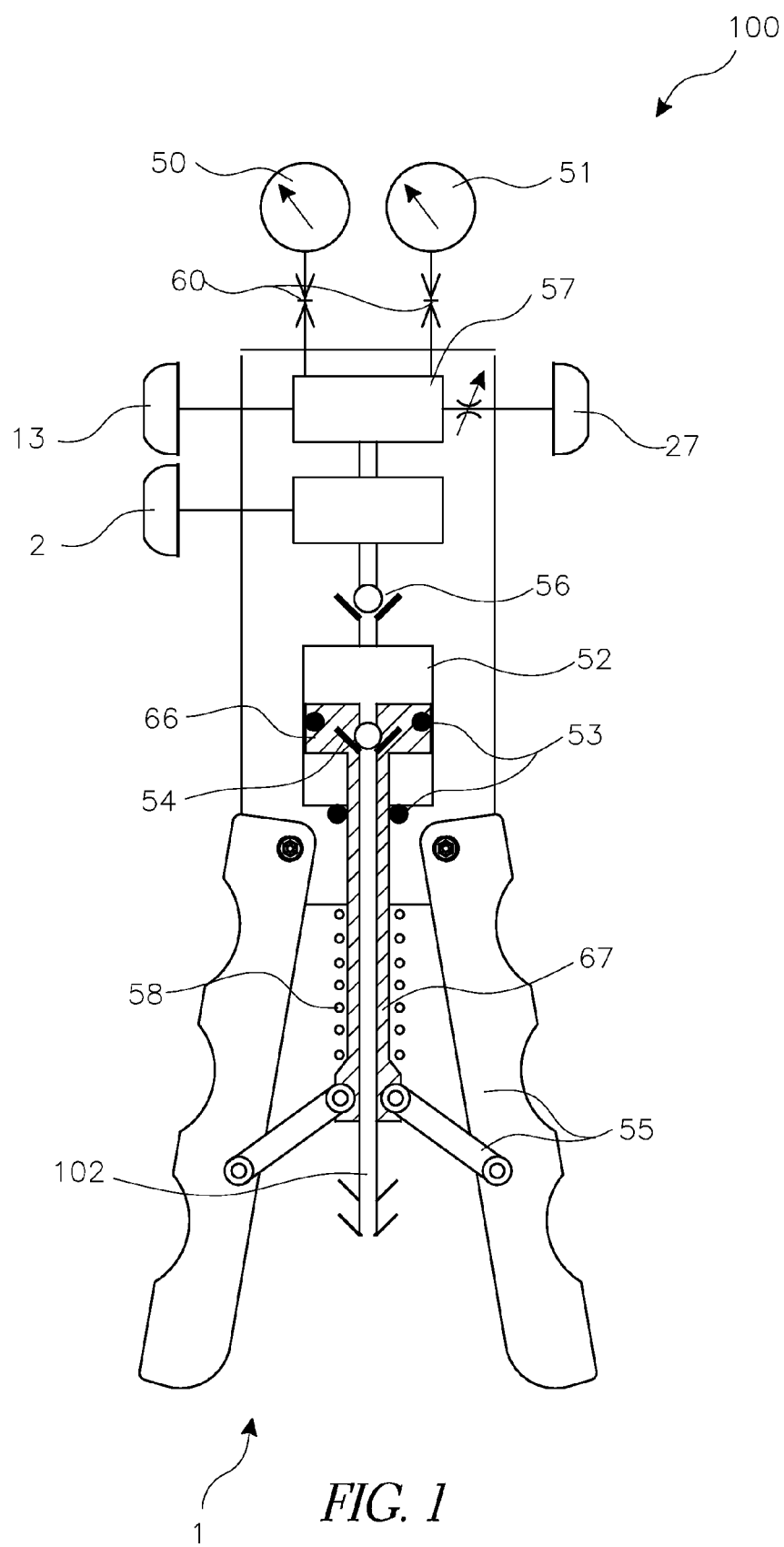
FIG. 1 illustrates a schematic view of one embodiment of a calibration pressure hand pump.

FIG. 1 illustrates a schematic overview of a multi-fluid calibration pressure device 100. As used herein, the term fluid can refer to any material or phase capable of fluid motion, such as a gas or liquid. The device can include an actuator mechanism 1, such as a hand pump. The handles 55 can be configured according to any standard mechanical mechanism to drive a piston rod 67 and piston 66 forward when the handles are squeezed, generating pressure in a fluid chamber 52. A spring or other biasing mechanism 58 can bias the handles toward an open position.

A fluid inlet channel 102 can connect to the chamber 52 through a bore in the piston rod 67 and piston 66. In some embodiments, a check valve 54 can be located inside the piston or piston rod. Various embodiments of a check valve are described in more detail below. Seals 53 can be installed around the piston 66 and piston rod 67 to help prevent escape of fluid.

The fluid chamber 52 can connect to a manifold 57 via a check valve 56 and a channel. The manifold 57 can communicate with a mode selector valve 2 (selecting between pressure or vacuum modes), a bleed valve and pressure relief valve combination 27 (PRV), and a volume adjuster 13. Various components are explained in further detail below.

Reference gauge 51 and a Unit Under Test (UUT) 50 can communicate with the manifold via ports, which may include quick disconnect couplings 60. Other types of connections between the gauges and the manifold can be used, such as threaded connections. Additionally, the gauges can be positioned at any convenient location on the calibration device.

Figure 2:
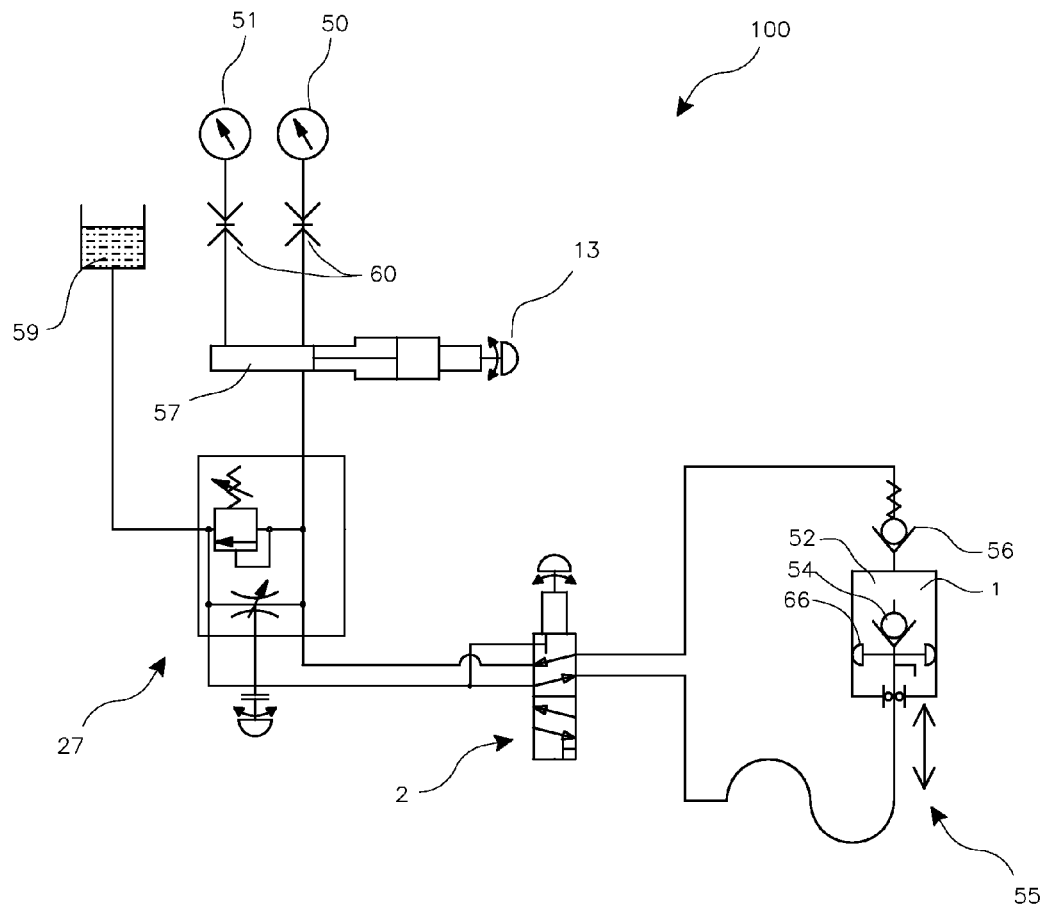
FIG. 2 illustrates a schematic of a fluid path of one embodiment of a calibration pressure device configured to provide pressure.
Figure 3:
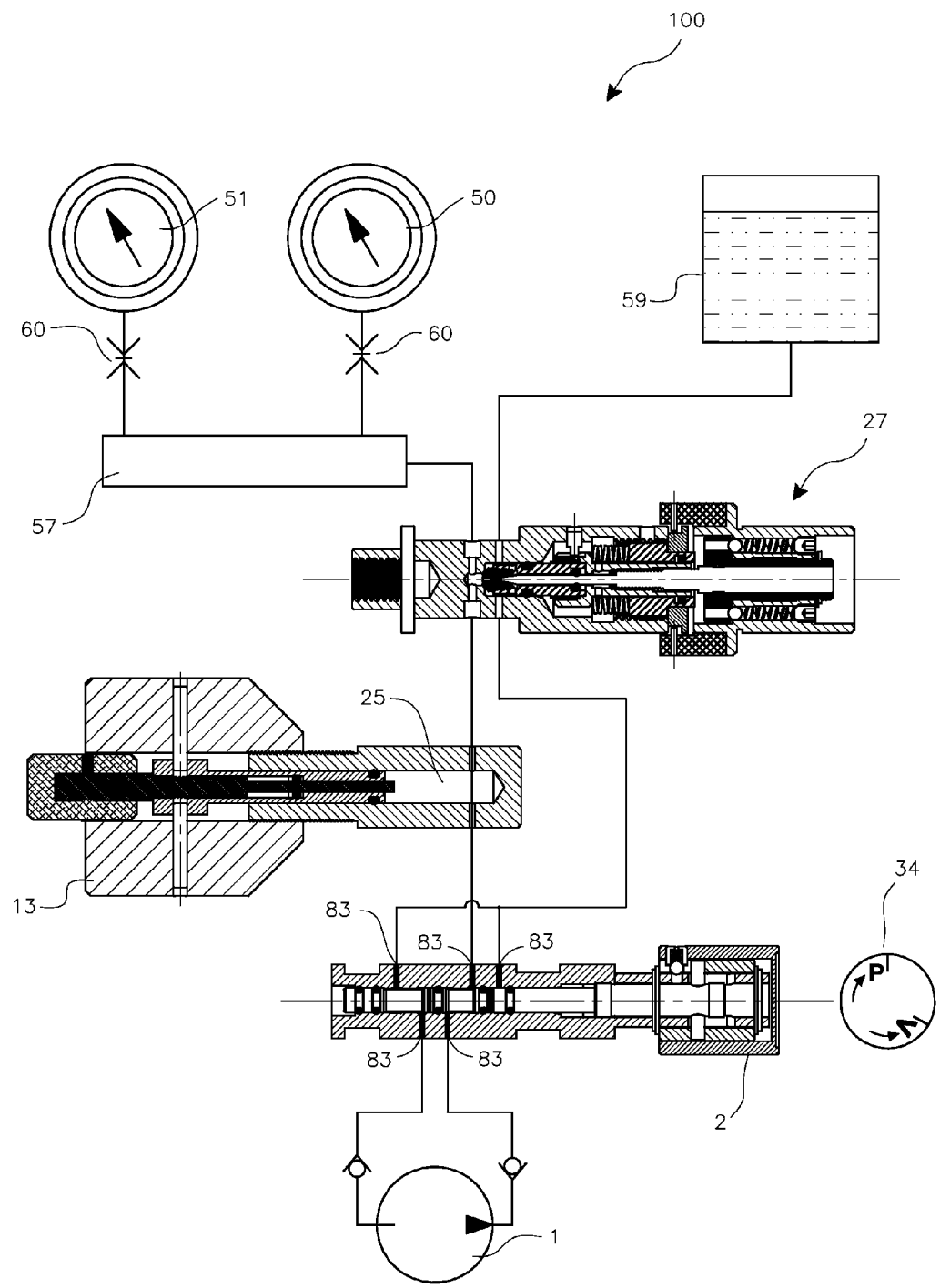
FIG. 3 is a schematic diagram of the main components and fluid connections of one embodiment of a calibration pressure device.

FIGS. 2 and 3 schematically illustrate the fluid connections between different components of a multi-fluid calibration pressure device. Fluid connection can be with rigid tubing or any other sealed conduit. As illustrated, in some embodiments the mode selector valve 2 can have at least five fluid connection ports 83 that connect to the system. In some embodiments, the selector valve can have two ports that connect to the pump 1 (one on each side of the pump), two ports that connect to a reservoir 59 (which can be a container and/or access to ambient), and one port that connects to the manifold 57. As best visible in FIG. 2, and as described further below, the two ports that connect to the pump can maintain fluid communication through the selector valve with the rest of the system, and the port that connects to the manifold can maintain fluid communication to the selector valve and the rest of the system. However, the selector valve can have a first position in which only one of the ports that connects to the reservoir is in fluid communication through the selector valve with the rest of the system. In the first position, a "pressure" mode, the mode selector valve 2 directs fluid from the reservoir 59 into the pump 1 inlet and directs the pressurized fluid exiting the pump through the volume adjuster 13 and the PRV 27 into the manifold 57, where it communicates with the gauges 50, 51. In a second position, only the other of the ports that connects to the reservoir can be in fluid communication through the selector valve with the rest of the system. In the second position, a "vacuum" mode, fluid is directed through the manifold 57, through the PRV 27, and through the volume adjuster 13 to the pump, where it is pumped back into the reservoir 59. The first and second positions are described in more detail below, as are different arrangements of connections to the ports of the selector valve.

In some embodiments, the connection between the selector valve 2 and the manifold 57 can pass through a chamber 25 of the volume adjuster 13 and through the PRV and bleed valve 27. The connection between the selector valve and the reservoir 59 can pass through the PRV and bleed valve. The volume adjuster can increase or decrease the size of the chamber 25, thus modifying the pressure in the line and in the manifold. In some embodiments, the volume adjuster can be configured to enable a coarse adjustment, useful when operating with pneumatic circuits, and a fine adjustment, useful when operating with hydraulic circuits. These are described in more detail below. The PRV and bleed valve can be adjusted to either block communication between the two lines passing through it or to allow varying degrees of communication, allowing the reservoir 59 and manifold 57 to partially or completely equalize in pressure, as desired. The PRV and bleed valve can offer a safety release and fine controlled bleeding of pressure.

As an example of how a calibration pressure device can be used, in some embodiments a user can connect a calibration pressure device to a pressure gauge of a UUT and to a reference gauge. A user can close the PRV and bleed valve, and use the mode selector to select pressure or vacuum mode, as desired. The user can then activate the pump (such as by pumping the handles) to approximate a desired pressure or vacuum level. The user can then use the volume adjuster and bleed valve to fine tune the pressure until the reading on the reference gauge is approximately equal to the desired pressure. The user can then compare readings of the reference gauge and the UUT, and record offsets.

The device can also be used in any application that requires introduction of accurate pressure levels over a wide range of values with no or minimal flow. For example, it can be used to leak test in many types of mechanical systems, medical devices, chromatography and more. It can also be used in applications that require evacuation of media from the UUT and replacement with another media for the duration of the test. The vacuum mode can be used for the evacuation and the pressure mode can introduce fluid back into the unit.

Selector Valve

As mentioned above, a mode selector valve can be used to alternate between a pressure mode and a vacuum mode. A selector valve can be attached to a pump inlet and outlet and to other components in a fluid calibration pressure device, and in the pressure mode certain components can receive pressurized fluid while in the vacuum mode those components can receive negative pressure (i.e., a vacuum). For example, in some embodiments, in the pressure mode a pump inlet can draw fluid from a reservoir (e.g., ambient) through the selector valve, and the pump outlet can pump fluid through the selector valve to a manifold. In the vacuum mode, the pump inlet can draw fluid from the manifold through the selector valve and pump fluid to the reservoir (e.g., ambient).

Figure 4:
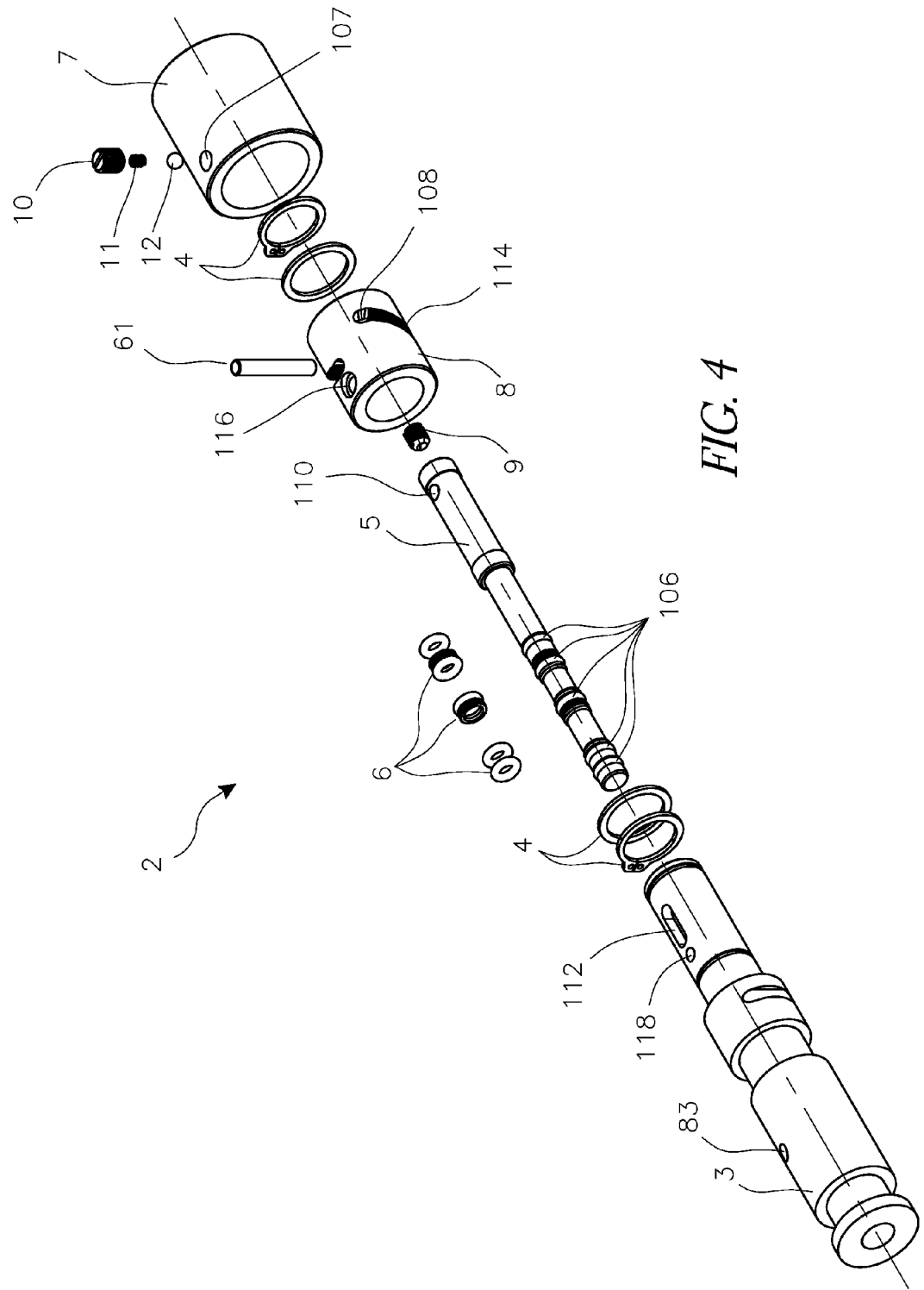
FIG. 4 is an exploded perspective view of one embodiment of a mode selector valve.
Figure 5:
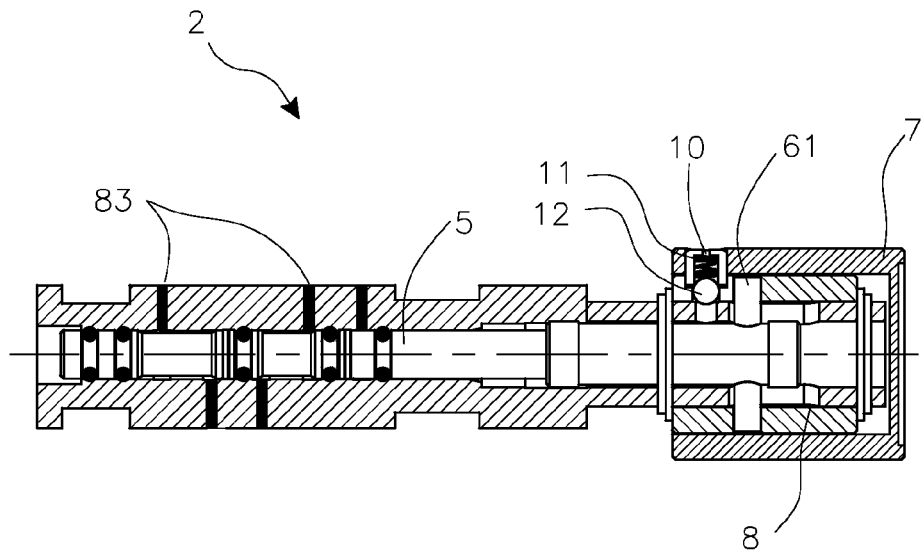
FIG. 5 is a cross section of one embodiment of a selector valve in a pressure position.
Figure 6:
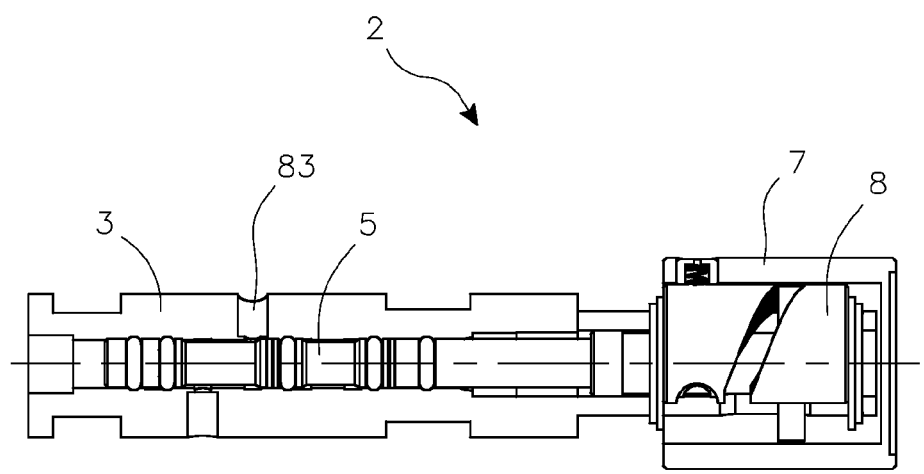
FIG. 6 is a sectional view of one embodiment of a selector valve in a vacuum position.

FIGS. 4-6 illustrate one embodiment of a mode selector valve 2. Generally, a mode selector valve functions by using an actuator 8 to provide linear motion of a spool 5 positioned concentrically and at least partially within a housing 3. In some embodiments, the actuator can be a cam, which can turn rotational motion of the actuator into linear motion of the spool. Linear movement of the spool and seals can adjust the connections between different ports 83 of the housing, which can change the selector valve from a pressure mode to a vacuum mode, as described further below.

In some embodiments, the valve can include O-Ring seals 6, which can be mounted onto grooves 106 on the spool to create a seal between the housing 3 and the spool 5. Preferably at least five seals 6 are used, and in some embodiments additional seals can be included as backups. Fluid in the internal cavity of the cylindrical housing 3 can communicate with other components of the pump through radial ports 83, as discussed above.

The spool may operate at extremely high pressures, and the spool and rings are preferably formed of materials that can support expected pressures. For example, in some embodiments the spool can be made of steel, such as stainless steel 300 series. In some embodiments, the O-rings can have a hardness of at least 70A durometer, which works better at high pressure, including pressures up to 10,000 psi. In some embodiments, O-rings can have a hardness of at least 90A durometer. In some embodiments, lower hardness levels can be used. In some embodiments, O-rings can be formed at least partially of polyurethane. In various embodiments, O-rings such as those provided under the brand name Resilon can be used. O-rings used in other components of the device can be of similar properties.

FIG. 4 is an exploded perspective view of one embodiment of a mode selector valve 2, FIG. 5 illustrates a sectional view of the selector valve in a first, pressure position, and FIG. 6 illustrates a sectional view of the selector valve in a second, vacuum position. As illustrated, the selector valve can have a cam 8 with an angled slot 114 that extends at least partially around a circumference of the cam. In some embodiments, one or both ends of the slot can have a section 108 that is generally parallel to the circumference of the cam (i.e., at 90 degrees relative to the longitudinal axis of the spool). The cam 8 can be mounted on the housing 3 in the orientation shown. Two retaining ring and fiber washer pairs 4 can be positioned on either side of the cam 8 to fix its axial position while still allowing it to rotate.

A knob 7 can be positioned around the cam, and can be attached to the cam such that rotating the knob rotates the cam and moves the spool axially. For example, when the spool 5 is positioned within the housing 3, a dowel pin 61 can be inserted through the cam slots 114, a slot 112 in the housing, and a hole 110 in the spool 5. A set screw 9 can be threaded into an end of the spool 5 to lock the pin 61 to the spool. The knob 7 can be mounted on top of the cam 8 so that a threaded hole 107 in the knob is aligned with a counter bore 116 of the cam 8. A ball 12, such as a steel ball, can be positioned into the hole 107, followed by a compression spring 11 and a spring retainer 10, which can be threaded. The ball can also contact a hole 118 in the housing 3. When tightened, the spring retainer 10 can engage the counter bore 116 of the cam 8, thus creating a rigid link to the knob 7 such that the cam rotates when the knob rotates. Other mechanical linking mechanisms can also be used.

Rotation of the cam 8 converts rotary motion of the knob 7 into axial motion of the pin 61, moving the spool 5 from a first position to a second position and vice versa. FIG. 5 illustrates the spool in a first position, and FIG. 6 illustrates the spool moved to a second position. The slot 114 in the cam can be at a fixed angle relative to the longitudinal axis of the spool, such that linear movement of the spool is constant relative to rotational movement of the knob and cam. The section 108 of the slot that is at approximately 90 degrees to the longitudinal axis of the spool can create a small portion at one or both ends of cam rotation where no axial motion of the spool occurs. These two portions, in conjunction with the ball 12 that can engage with a hole 118 in the housing, can create a mechanical lock at the end of motion of the knob and cam.

Additionally, the angle of the slot 114 can be configured according to a desired angle of rotation of the knob 7 to move the spool from the first position to the second position. For example, in some embodiments, the angle of the slot 114 can be configured such that approximately 90, 120, or 180 degrees of knob rotation are required to move the spool from the first position to the second position. In some embodiments, the angle of the slot can be configured such that no more than 360 degrees of knob rotation are required to move the spool from the first position to the second position.

FIGS. 7-10B illustrate an alternate embodiment of a selector valve, and more clearly illustrate the relationship between a spool and different ports 83 of the selector valve. The arrangement of ports in this embodiment can also be used in the selector valve embodiment of FIG. 4-6. Similarly, components called out and not specifically identified can be considered to operate the same as similarly labeled components of FIGS. 4-6 or to be usable according to the same embodiments described with respect to FIG. 4-6. For example, the cam can have the same slot 114 angles and can be configured to rotate the same amount as described above to move the spool from a first position to a second position.

Figure 7:
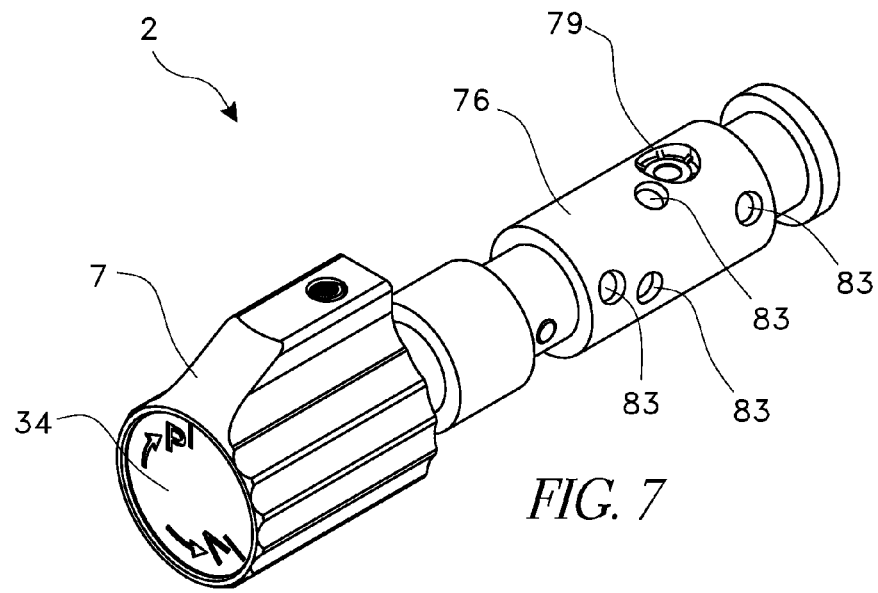
FIG. 7 is a perspective view of one embodiment of a selector valve.

FIG. 7 illustrates a perspective view of a selector valve 2. As described above, the valve can have a knob 7 that can attach to a spool 76 with a plurality of ports 83. The knob can have a decal 34 that identifies when the valve has selected a pressure mode and when the valve has selected a vacuum mode.

Figure 8:
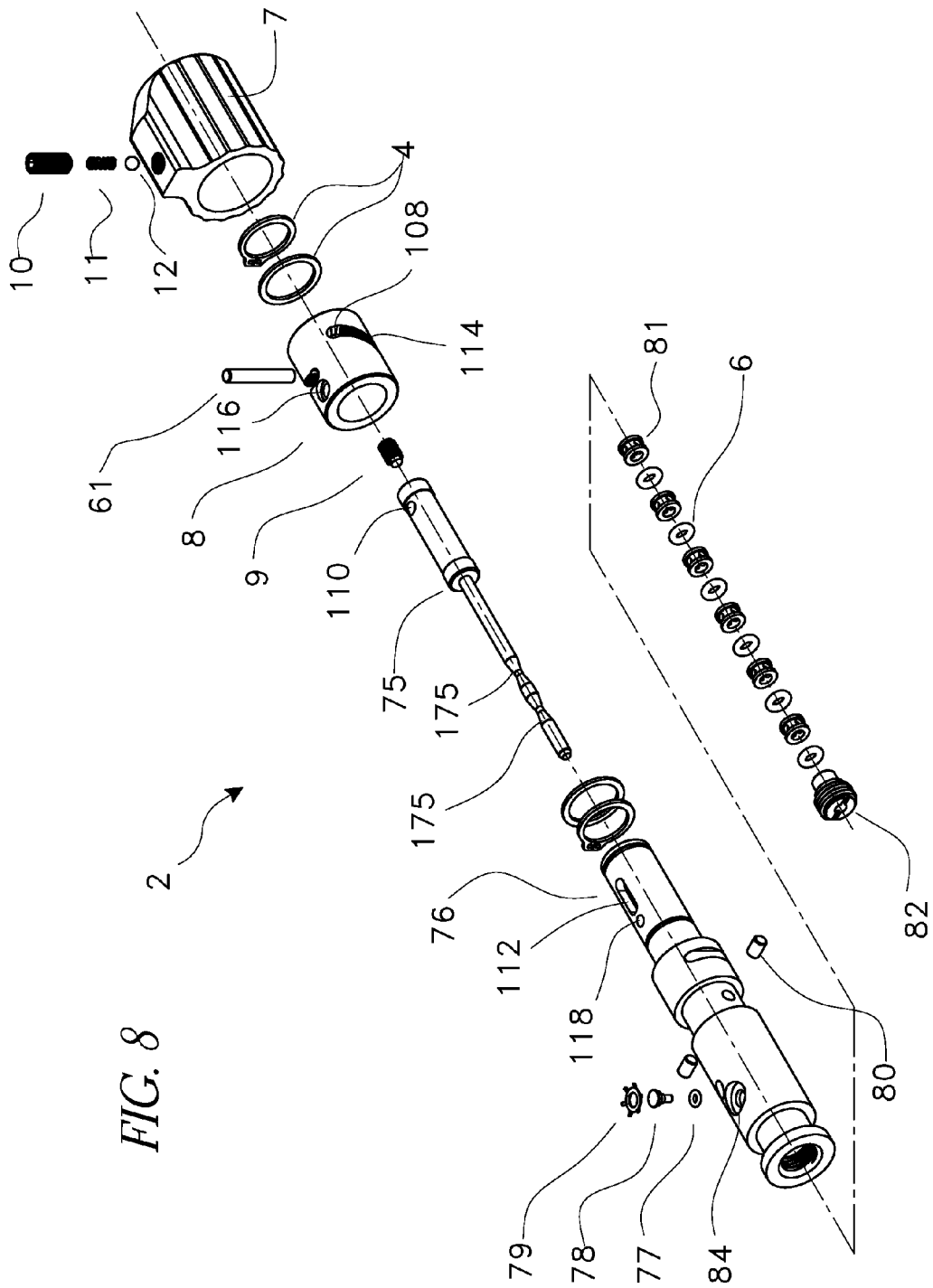
FIG. 8 is an exploded perspective view of the selector valve of FIG. 7.

FIG. 8 illustrates an exploded view of a selector valve. The selector valve can be assembled generally as described above. However, rather than having a spool 5 with grooves that receive O-rings, the selector valve of this embodiment can have a needle type spool 75. Spacer bushings 81 can be positioned within the selector valve housing 76, and O-rings or seals 6 can be positioned between the bushings inside a central bore of the housing. Preferably, there are at least six bushings with at least one ring between each bushing. At least some of the bushings can be positioned adjacent ports 83 of the housing 76.

The seals 6 can be configured to contact and seal against an outer diameter of the spool 75 and to contact and seal against an inner surface of the housing 76. The spool 75 can have at least one recessed portion 175, such that a volume of space can exist between the recessed portion of the spool and the interior surfaces of the bushings 81 and seals 6. In some embodiments, the spool can have two recessed portions that form a first fluid volume and a second fluid volume between the recessed portion of the spool and the interior surfaces of the bushings 81 and seals 6. This volume(s) can communicate with the ports 83 via radial holes 85 in the bushings (visible in FIG. 9B). Each bushing can have at least one radial hole that passes through the bushings' walls. In some embodiments, an intermediate fluid volume can exist between an outer surface of each bushing and an inner surface of the selector valve housing 76. In some embodiments, the radial holes of bushings adjacent a port 83 can be in fluid communication with the port via the intermediate fluid volume. In some embodiments, the radial holes of bushings adjacent a port 83 can be aligned with the port.

In some embodiments, locating pins 80 can help maintain the arrangement of seals and bushings in place on one end, and a stopper 82, such as a threaded stopper, can maintain them in position at the opposite end. In some embodiments, an additional lock pin 78 may be used in order to lock a bushing axially in place, thus helping prevent movement under extreme pressure conditions. The pin 78 can be inserted into a retaining hole 84, sealed with an O-Ring 77, and secured with a retaining ring 79.

Figure 9A:
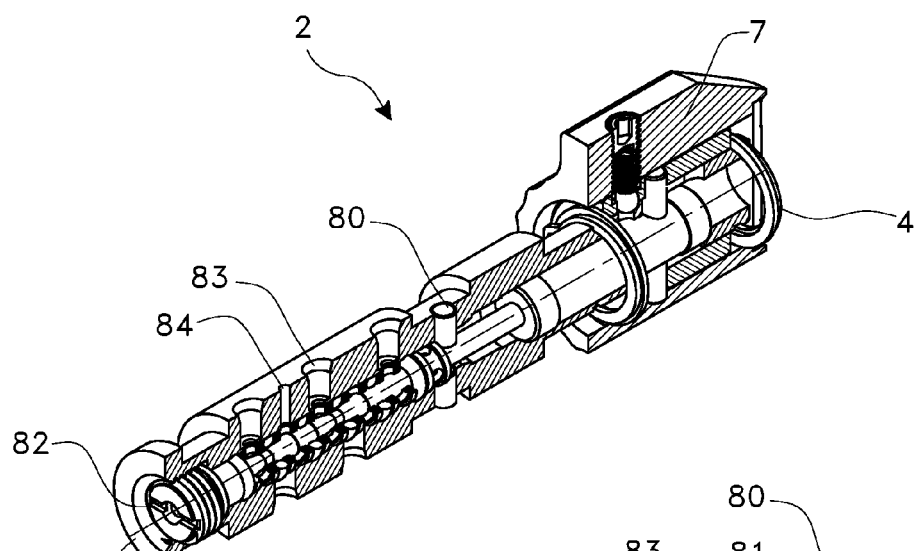
FIG. 9A is a perspective sectional view of the selector valve of FIG. 8.
Figure 9B:
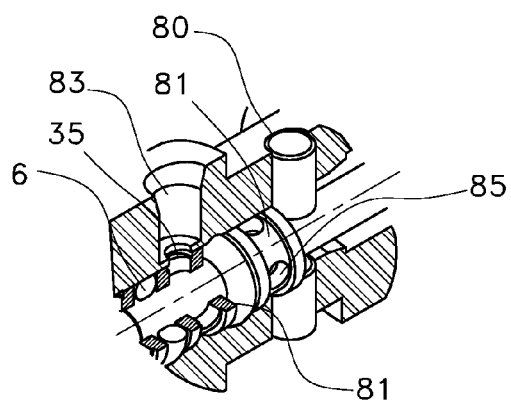
FIG. 9B is a detail view of a section of FIG. 9A.
Figure 10A:
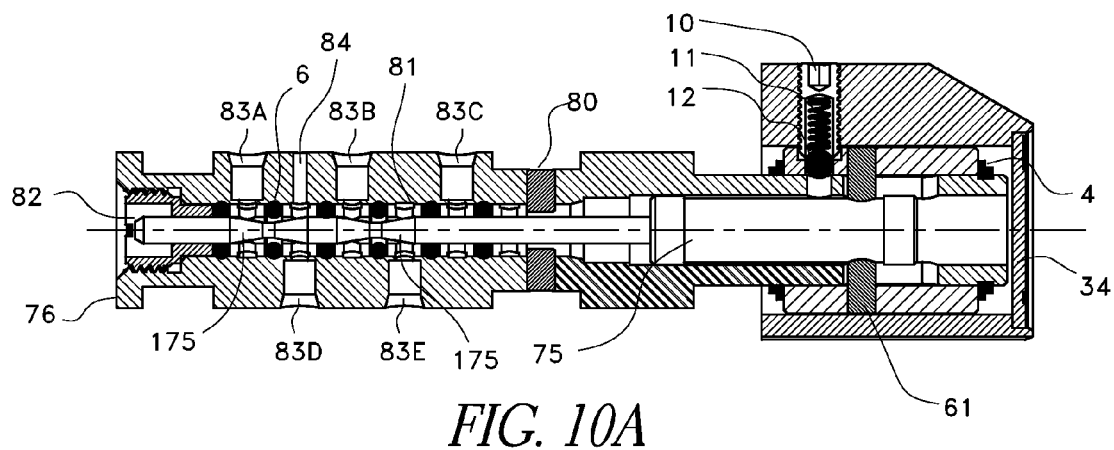
FIG. 10A is a cross-sectional view of the selector valve of FIG. 9A in a pressure position.
Figure 10B:
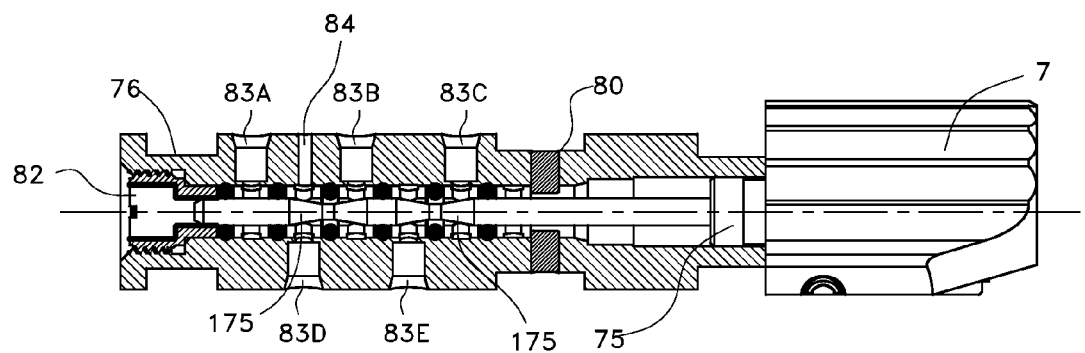
FIG. 10B is a cross-sectional view of the selector valve of FIG. 9A in a vacuum position.

FIGS. 9A and 9B illustrate perspective sectional views of the selector valve 2. FIG. 9A is a view of the whole valve and FIG. 9B is a detail view of a section that illustrates bushings 81 with their radial holes 85. FIGS. 10A and 10B illustrate cross-sectional views of the selector valve. In FIG. 10A, the valve is in a first position configured for pressure, and in FIG. 10B the valve is in a second position configured for vacuum.

In FIGS. 9A-10B the ports 83 are all illustrated as aligned for ease of illustration. They are not required to be aligned, and can be in any circumferential position as desired to more easily connect them to other sections of the calibration device.

In the first position, as illustrated in FIG. 10A, the spool 75 is positioned with the recessed portions 175 aligned such that a first port 83A communicates through the selector valve with a fourth port 83D (e.g., communicates through a first fluid volume), a second port 83B communicates through the selector valve with a fifth port 83E (e.g., communicates through a second fluid volume), and a third port 83C is sealed from communication with other ports through the housing 76 of the selector valve. The first port and third port can communicate with the reservoir 59 and the fourth port can communicate with an inlet to the pump 1 (illustrated in FIG. 3). The second port can communicate with the manifold 57 and the fifth port can communicate with an outlet of the pump (illustrated in FIG. 3). Thus, in the first position, the pump will draw fluid from the reservoir (or ambient) and pump it to the manifold.

In the second position, as illustrated in FIG. 10B, the spool 75 has translated axially such that the first port 83A is sealed from communication with other ports through the housing 76 of the selector valve, the second port 83B fluidly communicates through the selector valve with the fourth port 83D (e.g., communicates through the first fluid volume), and the third port 83C fluidly communicates through the selector valve with the fifth port 83E (e.g., communicates through the second fluid volume). In this position, the pump will draw fluid from the manifold (thus creating a vacuum) and pump it to the reservoir (and/or ambient). The spool can be translated by rotating the knob 7, as described above.

In some embodiments, as the spool 75 transitions between the first and second positions it can place a port that communicates with the reservoir 59 into fluid communication with a port that communicates with the manifold 57. For example, in the illustrated embodiment, when the spool is in a third position between the first and second positions, a recessed portion 175 can be positioned such that the second port 83B, which communicates with the manifold, is also in fluid communication through the selector valve with the third port 83C, which communicates with the reservoir. This can allow the selector valve to be used as a "quick release" of pressure or vacuum in cases of emergency, quickly allowing pressure to equalize between the reservoir and the manifold. Pressures in this embodiment can equalize more quickly than when using a bleed valve, described in more detail below.

In some embodiments, the ports can be arranged and connected differently, so long as in a first position the pump draws fluid from the reservoir (and/or ambient) and pumps it to the manifold, and in a second position the pump draws fluid from the manifold and pumps it to the reservoir. For example, in some embodiments, the first port 83A and third port 83C can communicate with the manifold 57 and the second port 83B can communicate with the reservoir 59. In a first position, the second port 83B fluidly communicates through the selector valve with the fourth port 83D, which can connect to the pump inlet, and the third port 83C fluidly communicates through the selector valve with the fifth port 83E, which can connect to the pump outlet. In this position, the pump will draw fluid from the reservoir (or ambient) and pump it to the manifold. Similarly, in a second position the first port communicates through the selector valve with the fourth port and the second port communicates through the selector valve with fifth port, such that the pump draws fluid from the manifold (thus creating a vacuum) and pumps it to the reservoir (or ambient).

As illustrated, in some embodiments the seals 6 of the selector valve 2 remain stationary as the spool 75 moves. This can help maintain the life of the seals, which tend to deform under high pressures and can be sensitive to surface irregularities, like steps or holes in the housing 76. Because the seals don't move relative to the housing and only move relative to the smooth surface of the spool 75, their service life can be prolonged. Additionally, this arrangement can make it easier to switch selector modes under high pressure conditions.

In some embodiments, a selector valve may use a different actuator to axially push and pull the spool between its operational positions (i.e., between pressure mode and vacuum mode). Preferably, any actuator used allows an operator of the device to easily switch between the different operational positions. However, the pump can still function with other types of selector valves, such as selector valves that require larger torque to operate or are less reliable due to metal to metal seal contacts that deteriorate over time and quickly bleed gas when loosened during pneumatic applications. Additionally, in some embodiments, pumps that are designed only for a hydraulic or a pneumatic application may not have a selector valve.

Pressure Release Valve and Bleed Valve

A pressure release valve and "micro metering" bleed valve assembly (PRV combination) can be used to control slow bleeding of pressure from the system in order to achieve a desired pressure in the manifold. In various embodiments described herein, a PRV combination can be used to control bleeding of pressure in both pneumatic and hydraulic applications. As described herein, the term "bleeding" can refer not just to lowering the pressure in the system, when the device is operating in pressure mode, but also letting atmospheric pressure enter the system when the device is operating in vacuum mode. A PRV combination can also be used as a valve for safety purposes, and can be configured to quickly bring the pressure in the system to atmospheric. A PRV combination can also have a uni-directional clutch that prevents the PRV combination from being tightened to a point that damages it. Various components of the PRV combination can be formed of different materials. Preferably, the internal parts are formed of a hard, corrosion resistant material, such as stainless steel.

Although described herein as a combination, in some embodiments a calibration pressure device can include just a pressure release valve or just a bleed valve, as described further below.

FIGS. 11-13 illustrate one embodiment of a PRV combination 27. FIG. 11 illustrates an exploded perspective view, FIG. 12 is a perspective sectional view, and FIG. 13 is a cross-sectional view of a PRV combination 27. The PRV combination can comprise a housing 28, which is preferably cylindrical. The housing can have radial ports 69, preferably four, which can connect to an internal cavity of the housing. The ports are variously drawn in different locations for illustration purposes. Generally, there will be two sets of ports, a set of ports on one side of a seal tip 31, further from a knob assembly 38, and a set of ports on the other side of the seal tip, closer to the knob assembly. The ports can have any orientation relative to each other that makes connecting the ports to other parts of the device easier. The ports that are further from the knob assembly can maintain fluid communication with each other and can connect to the manifold 57. The two ports that are closer to the knob assembly can maintain fluid communication with each other and can connect to the reservoir 59 and/or atmospheric pressure. In an assembled calibration pressure device, some of the ports can connect to other components in the system, such as a selector valve, a pump, or a volume adjuster. The PRV combination can bleed pressure by operating to allow fluid communication between ports connected to the manifold and ports connected to the reservoir and/or atmosphere. In some embodiments, this fluid communication can occur through a channel 169.

The housing 28 can include threaded cylindrical openings at both ends. The end furthest from the knob assembly 38 can be used to secure the PRV combination to a multi-fluid calibration pressure device. In some embodiments, a pin 29 can be used to provide a more secure attachment. In some embodiments, the end closest to the knob assembly can receive a bonnet 36, which can be used to secure a plunger assembly 130 within the housing 28.

The plunger assembly can include a sealing tip 31 with a central lumen 131 through it, a plunger 32, and an O-ring 33 positioned around a plunger groove 132 and configured to create a seal between the plunger 32 and an interior surface of the housing 28. The sealing tip can attach to a first end of the plunger. In some embodiments, the sealing tip can have threading, allowing it to screw into the plunger 32. In some embodiments, the sealing tip can be threaded with left hand thread. In some embodiments, as illustrated, the sealing tip can have an angled distal surface. In some embodiments, the sealing tip 31 can have a flat distal surface that engages an elevated surface of an opening to the channel 169 that connects the manifold 57 and the reservoir 59. FIG. 14 illustrates a detail sectional view of one such embodiment.

The plunger 32 can attach to a carrier 35, preferably with a threaded connection, and a needle 43 can pass through the carrier and into the plunger. In some embodiments the carrier 35 can have an axial groove 135 cut into it, and a set screw 30, such as a set screw with a dog point tip, can be inserted through a hole in the housing to engage the groove. In some embodiments, the needle 43 can have a smooth cylindrical section on its proximal end that engages with a portion of the knob assembly 38, such as a clutch bushing 45. A set screw 68 (visible in FIG. 12) can be used to secure the needle and clutch bushing to each other. The needle can also have a threaded section that engages an internal thread of the carrier 35, and a distal tip that can extend into and seal the lumen 131 of the sealing tip 31.

In some embodiments, an O-ring 65 can be positioned between the carrier 35 and the bonnet 36, thus supporting the plunger assembly. A spring element, such as disc springs 37, can be positioned proximate a second end of the plunger. For example, the spring element can be positioned between the bonnet 36 and an edge of the carrier 35. The spring element can provide a compression force between the two components. Also, in some embodiments an O-ring (and possibly a backup ring) 64 can be mounted within the plunger 32 to create a liquid tight seal between the needle 43 and the internal walls of the plunger 32.

The force of the disc springs can bias the plunger 32 into a first position in which the sealing tip 31 is against an opening to the channel 169 that connects the manifold 57 and the reservoir 59, creating a seal on the channel opening and blocking fluid communication between the manifold and reservoir. The force or load on the sealing tip 31 can be adjusted by turning the bonnet 36 in its threads, thus compressing or relaxing the spring element 37 against the carrier 35. When the pressure in the manifold reaches a "cracking" pressure determined by the load on the sealing tip, the plunger will be pushed backward into a second position in which the sealing tip 31 no longer seals the opening to the channel 169, allowing for high pressure fluid bleed. Thus, by compressing or relaxing the disc springs, a maximum desired pressure can be selected beyond which the sealing tip will be pushed open and high pressure fluid can bleed. This action of the sealing tip forms a pressure release valve. In some embodiments in which a device only has a pressure release valve, the sealing tip may not have a central lumen.

In embodiments of a PRV combination or where a device only has a bleed valve, the sealing tip may have the central lumen 131. The lumen 131 through the sealing tip 31 can create a fluid path between the manifold and reservoir when it is not blocked by the bleed valve needle 43, which can engage with the back side of the lumen 131. The lumen can be used for finely controlled, or "micro metering," bleeding. Turning the knob assembly 38 in one direction, typically counter-clockwise, can cause the needle to retract, opening the lumen 131 and allowing system fluid to bleed. The knob assembly can include a knob 39, held axially in place by a retaining ring and washer 44, which can be a fiber washer or a steel washer. The knob can be grasped and used to rotate the knob assembly 38. In some embodiments, as illustrated in FIG. 13, a larger diameter ring 46 can be added to the knob. Turning the knob while using the large diameter ring allows for more delicate adjustment of the bleed valve needle 43. Turning the knob with smaller diameter sections can be used for quick fluid discharge and pressure drop when needed. Another function of the large diameter ring 46 is to protect the knob assembly from debris and to act as a mechanical stop in combination with a stopper pin 47 and a lock ring 48.

Tightening the knob 39 too much can cause the needle 43 to damage the sealing tip 31. For example, in some embodiments the sealing tip can be made of a polymer, such as Vespel or Peek, and over-tightening can deform the tip. To help prevent over-tightening, in some embodiments the knob assembly 38 can include an adjustable slip clutch. The knob assembly can include a clutch bushing 45 within the knob and attached to the proximal end of the bleed valve needle. Rotating the clutch bushing can cause the needle 43 to advance against the sealing tip 31. The clutch bushing can have a plurality of holes 145, which in some embodiments can pass through the clutch bushing. In some embodiments, the clutch bushing has two holes.

In some embodiments, the knob can have channels 147 that align with the holes 145, and a ball 42, which is too large to pass through each hole 145, can be positioned within the knob channels and against each hole 145 to provide a mechanical connection between the knob and the clutch bushing. The balls can be biased by a biasing member 41, such as a spring, against each hole 145. Rotating the knob 38 causes the balls to rotate about a longitudinal axis of the clutch bushing, and the contact between the balls and clutch bushing can cause the clutch bushing to rotate. As the clutch bushing is tightened, a point will be reached where the force required on the balls to tighten further is greater than the force provided by the spring, and the clutch will slip. An adjustable set screw 40 can be positioned behind each biasing member, such that tightening or loosening the set screw increases or decreases the biasing force on the ball, thereby adjusting the point at which the clutch slips.

In some embodiments, openings to the holes 145 can be asymmetrically chamfered such that the chamfer where the balls slip when rotated in a tightening direction is shallower than that on the opposite side. This results in a lower torque limit for tightening, while the torque necessary to loosen the knob 39 and clutch bushing 45 can still be applied. Additionally, varying the number of holes 145, balls 42, and biasing members 41 can also affect the maximum torque that the slip clutch can provide. In some embodiments, other aspects of the slip clutch can be designed asymmetrically to provide a torque limit for tightening the knob that is lower than the torque limit for loosening the knob.

Volume Adjuster

One difficulty in using a volume adjuster to adjust pressure in a multi-fluid pump (e.g., a pump that can be used for hydraulic or pneumatic applications), is that volume adjustments required for a pneumatic application can be significantly greater than volume adjustments required for a hydraulic application. A typical volume adjuster includes a piston that is moved along a cylinder axis by means of a threaded knob. Adjustment of manifold pressure in pneumatic applications requires a relatively large volume to be adjusted, and volume adjusters for such applications can have pistons with relatively large diameters and stroke lengths. Using the same volume adjuster for hydraulic applications requires a significant torque application by the operator due to the high fluid pressure in the manifold. In addition to making adjustments difficult, the required torque can also make it difficult to fine tune pressure levels. For example, in many applications pressure levels are required to be tuned to within 0.1% of an indicated value.

Various volume adjusters described herein have features that allow them to be easily used for both hydraulic and pneumatic applications without requiring excessive torque. For example, in some embodiments a volume adjuster can have a coarse adjustment knob configured to control a piston with a surface area appropriate for adjusting pneumatic pressure levels. A fine adjustment knob can control a piston with a smaller surface area appropriate for adjusting hydraulic pressure levels. In some embodiments a volume adjuster can have both a coarse and fine adjustment knob and pistons within the same component, and in some embodiments they can be concentrically arranged. This can save space and weight for a fluid calibration device. This can also improve the functionality of a device by providing both coarse and fine adjustment capabilities within the same handle or knob, making the device easier to learn and use. Additionally, in embodiments that have both a volume adjuster and a bleed valve, use of both components can allow for adjusting a pressure source to a pre-determined level quickly and with minimal physical effort.

Figure 15:
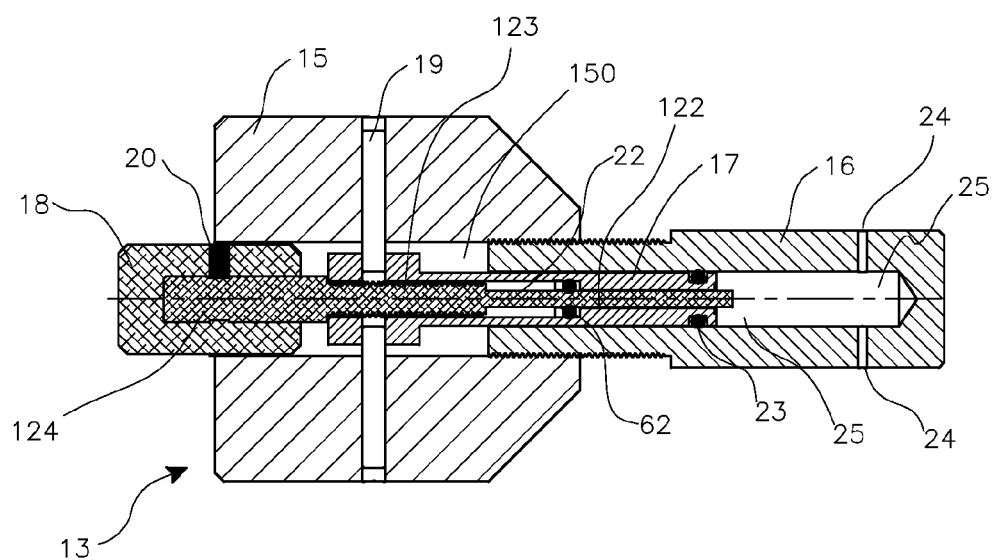
FIG. 15 is a cross section of one embodiment of a volume adjuster.

FIG. 15 illustrates one embodiment of a volume adjuster 13. The volume adjuster can have a housing 16, a primary piston 17, a secondary piston 22 and a primary knob assembly 15 with a central bore 150. The volume adjuster can have a distal end that includes a chamber 25 and a proximal end that includes the knob assembly 15. The cylindrical housing 16 exterior can be partially threaded. It can be sized and configured to engage internal threading in the bore 150 of the knob 15.

The primary, coarse adjustment, piston 17 can be positioned at least partially inside a cylindrical cavity of the housing 16 in a concentric manner. In some embodiments, the primary piston can have a central channel or bore that extends through it. In some embodiments, at least a portion of the central bore can have internal threading.

The primary piston can be connected mechanically to the knob 15, such as by two pins or screws 19. A seal, such as an O-ring 23 (and in some embodiments one or more backup O-rings) can be mounted between an exterior body of the piston assembly 17 and internal walls of the housing 16, thereby creating a fluid tight seal between the chamber 25 and other sections of the volume adjuster. One or more radial channels or ports 24 can create a fluid path between the chamber 25 and the other components of the calibration device. The ports 24 can be arranged in any convenient manner.

A secondary, fine adjustment, piston 22 can be positioned concentrically within the primary piston 17 and at least partially within the cylindrical cavity. The distal ends of the primary and secondary pistons can close the cylindrical cavity of the housing 16 to form the chamber 25. Both the fine and coarse pistons can be formed of smooth, hard materials, such as stainless steel or sapphire, in order to minimize friction and extend their working life times. In some embodiments, one of the pistons can be formed of a first material and another of the pistons can be formed of a second material.

The secondary piston 22 can have a distal section 122 with a smooth exterior surface, a middle section 123 that can have a threaded exterior, and a proximal section 124. The middle section can engage internal threading in the primary piston 17 to mechanically link the two pistons. An O-ring 62 (and in some embodiments one or more backup O-rings) can be mounted inside the primary piston 17 to seal between the distal section 122 of the secondary piston 22 and the internal walls of the primary piston 17. The proximal section 124 of the secondary piston 22 can extend into and engage a secondary knob 18 that has a smaller diameter than the main knob 15. In some embodiments, the secondary knob can be positioned at least partially within the primary knob. A set screw 20 or other securing device can be used to secure the secondary knob 18 to the secondary piston 22.

Rotating the primary knob 15 can move both the primary piston 17 and secondary piston 22 relative to the housing 16, thus changing the volume of the chamber 25 and altering the pressure of fluids connected to the chamber. The friction force between the knob 15 and the housing 16 increases when the system pressure is elevated. However, in some embodiments the thread that engages the coarse adjustment piston 17 with the secondary piston 22 can be smaller in diameter than the threading between the primary knob 15 and the housing 16. In some embodiments, the pitch of the thread that engages the coarse adjustment piston with the secondary piston can also be smaller than the pitch of the threading between the primary knob and the housing. These differences can mean that rotation of the fine adjustment knob 18 when the system is under pressure can require less torque compared to the torque required to turn the large knob, such that the large knob does not move when the smaller knob is rotated. Consequently, if fine adjustments to pressure need to be made, rotating just the secondary knob 18 can move just the secondary piston 22 relative to the housing 16. Because the secondary piston is smaller than the primary piston, it will have a lesser effect on the volume of the chamber and on the consequent pressure of fluids in communication with the chamber.

Figure 16:
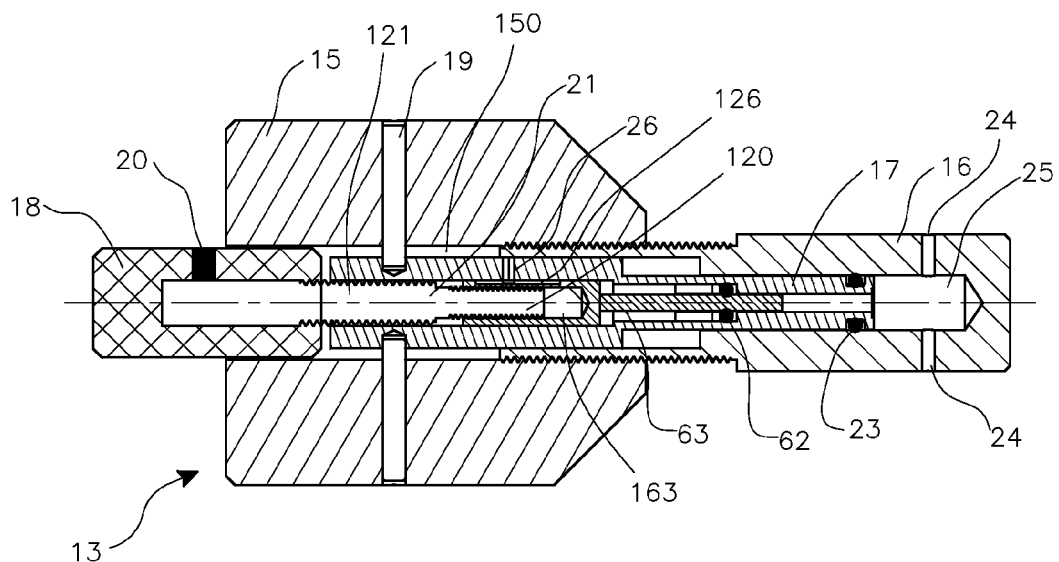
FIG. 16 is a cross section of one embodiment of a volume adjuster.

FIG. 16 illustrates one embodiment of a volume adjuster 13 that can be used for ultra-fine tune volume adjustment in addition to coarse adjustment. The embodiment of FIG. 16 is assembled similarly to that of FIG. 15, but the secondary piston 63 does not rotate relative to the primary piston 17. The secondary piston 63 can slide axially relative to the primary piston 17. A pin 26 engaged in a slot 126 on an exterior surface of the secondary piston can prevent relative rotational motion between the two pistons, while still allowing relative axial motion.

The secondary piston 63 of the embodiment of FIG. 16 can have an internally threaded bore 163 that receives a distal section 120 of a differential screw 21. A central, threaded section 121 of the differential screw can engage internal threading of the primary piston 17, and the proximal end of the differential screw can attach to the secondary knob 18. In some embodiments, the threading on the central section of the differential screw can have a thread diameter that is greater than the thread diameter of the threading on the distal section of the differential screw.

The threading of the differential screw can vary between its different sections. For example, the threading on the distal section 120 of the screw can have a greater thread diameter than the threading on the central section 121. In some embodiments, the threading on the distal section 120 of the screw can have a different pitch than the treading on the central section 121 of the screw. In some embodiments, the distal section is threaded by small diameter thread with a fine pitch, for example #8-32 UNC-2B. The central section can have a larger diameter and can be threaded with a coarser thread, for example #10-24 UNC-2A. Thus, rotation of the secondary adjustment knob 18 can create a small axial motion of the fine adjustment piston 63 relative to the primary piston 17, caused by the small difference between the two threads' pitches. This small axial motion can make very small changes to the volume of the chamber 25.

Figure 17:
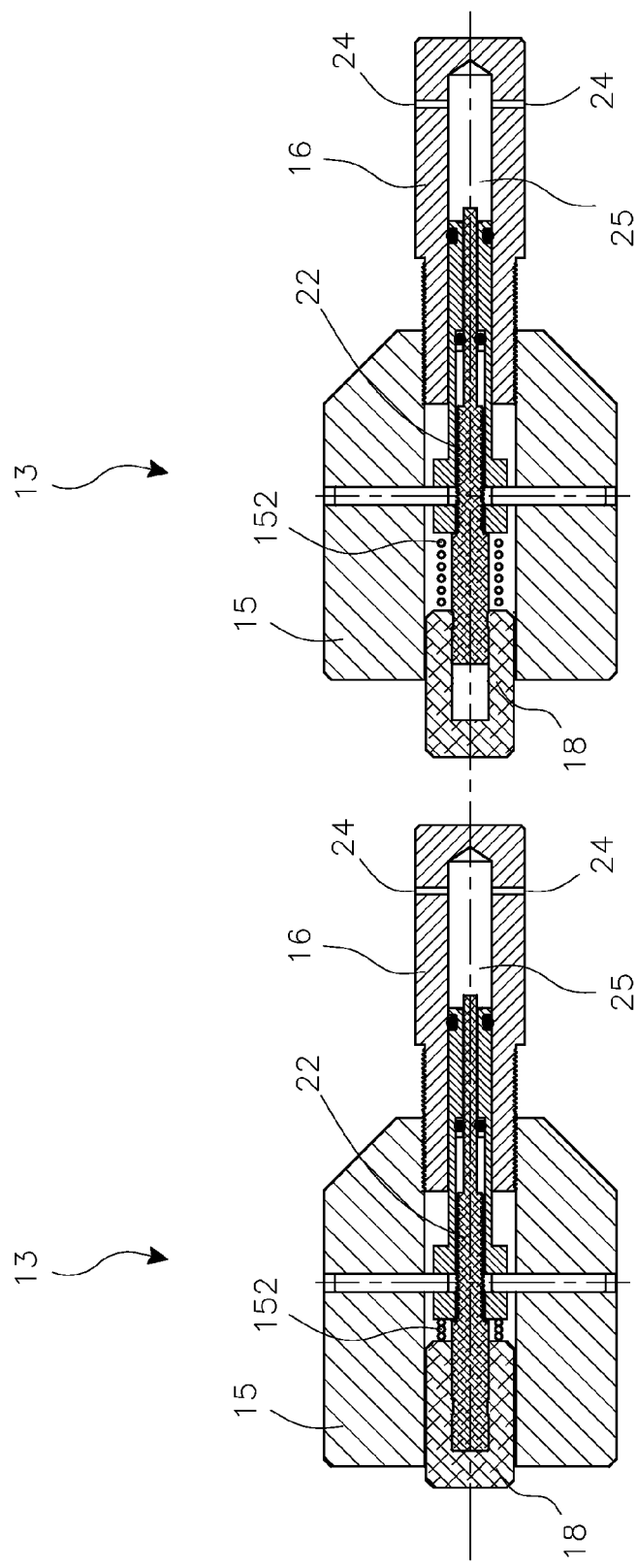
FIG. 17A is a cross section of one embodiment of a volume adjuster with a fine adjustment knob in a secured position.
FIG. 17B is the volume adjuster of FIG. 17A with the fine adjustment knob in a released position.

In various embodiments, the secondary adjustment knob can be made in different forms to save space and weight for the device. For example, FIGS. 17A and 17B illustrate one embodiment of a volume adjuster 13 where the secondary knob 18 can be hidden inside of the primary knob 15. In FIG. 17A, the secondary knob is in a first position within the primary knob, and in FIG. 17B the secondary knob has been pulled into a second, released position. A spring 152 can be used to bias the secondary knob into the first position. The secondary knob can be configured such that simply pulling it will release it, or a double click mechanism can be used, as is known in the art.

Figure 18:
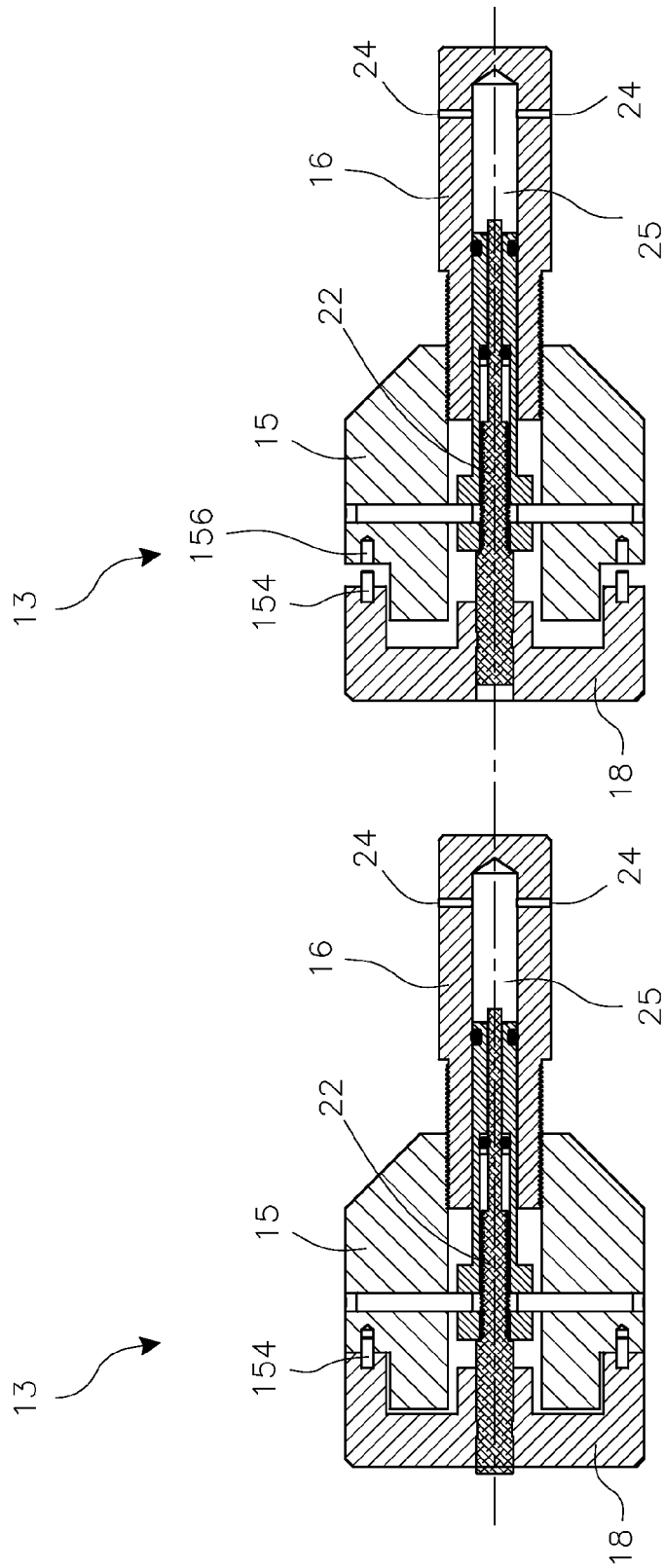
FIG. 18A is a cross section of one embodiment of a volume adjuster with a fine adjustment knob in a secured position.
FIG. 18B is the volume adjuster of FIG. 18A with the fine adjustment knob in a released position.

FIGS. 18A and 18B illustrate another design for a secondary knob 18. The secondary knob can be of similar diameter as the primary knob 15, and can have a projection or pin members 154 that are configured to engage a corresponding recess or recesses 156 of the primary knob 15. When engaged, the primary and secondary knobs rotate together. Pulling the fine adjustment knob outwards enables its independent rotation and fine volume adjustment, as described according to various embodiments herein. In both of the embodiments of FIGS. 17A and 17B, and FIGS. 18A and 18B, the secondary shaft 122 can be linked to the secondary knob 18 through a spline mechanism that allows free relative axial movement between the two and that transfers rotational force from the knob to the shaft. Also, both of the embodiments of FIGS. 17A and 17B, and FIGS. 18A and 18B can be used with any other embodiment of volume adjusters described herein.

Figure 19:
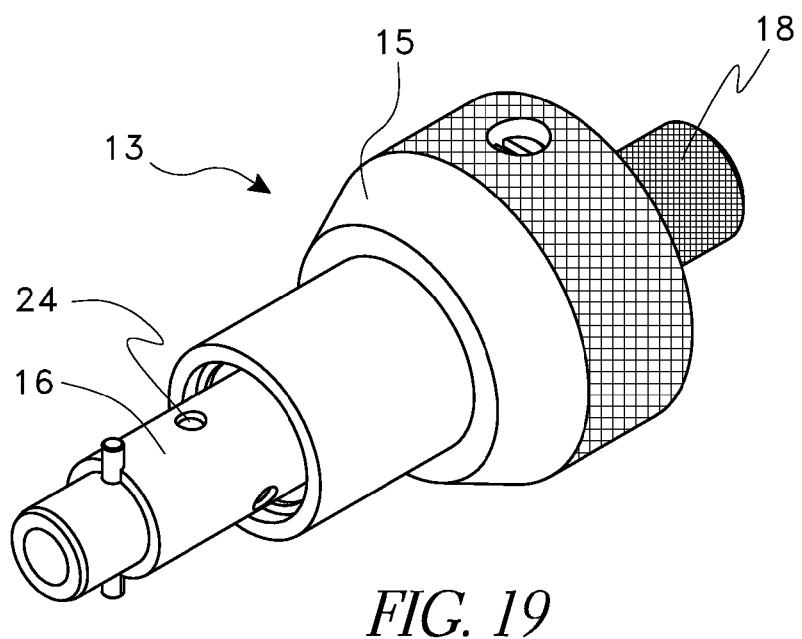
FIG. 19 is a perspective view of one embodiment of a volume adjuster.
Figure 20:
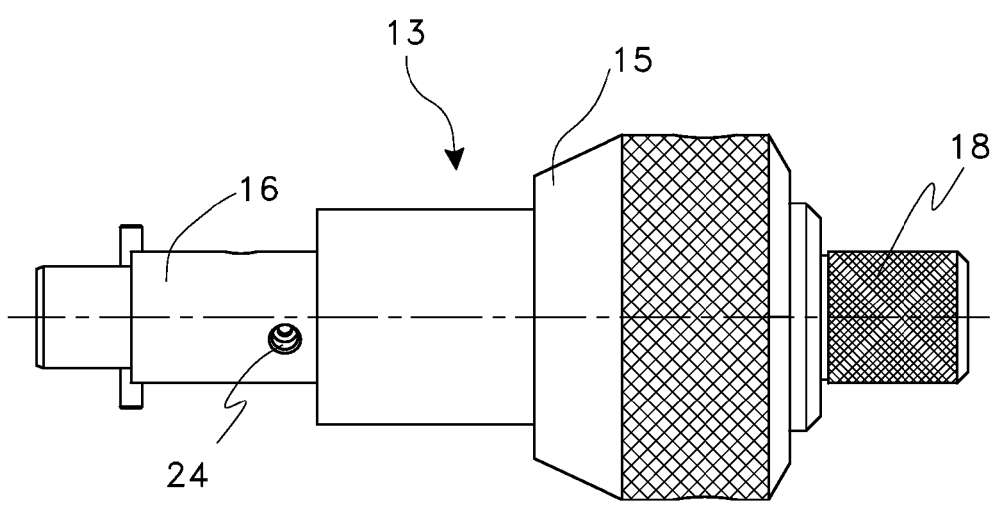
FIG. 20 is a side view of the volume adjuster of FIG. 19.

FIGS. 19-24 illustrate another embodiment of a volume adjuster for use with a calibration pressure device. FIG. 19 is a perspective view of the assembled volume adjuster, which can have the various components previously described. FIG. 20 is a side external view of the same device.

As described with respect to various embodiments above, the volume adjuster 13 can have a first knob 15 configured for coarse volume adjustment, a second knob 18 configured for fine volume adjustment, and a housing 16 with one or more ports 24 connecting to a chamber within the housing.

Figure 21:
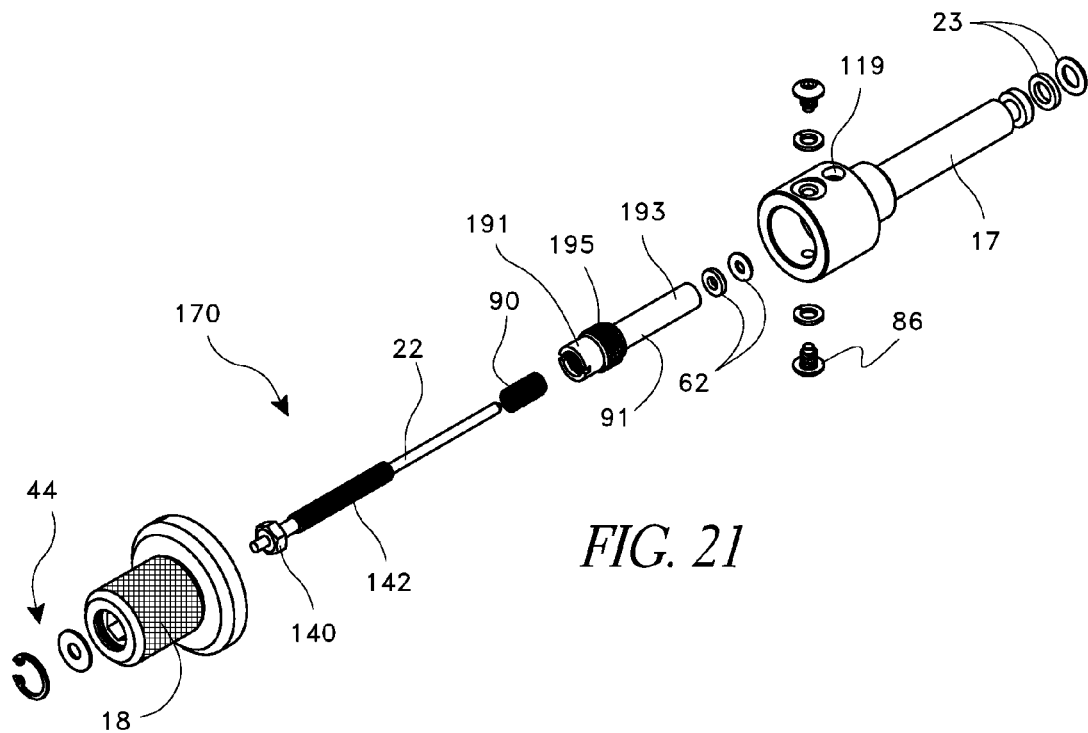
FIG. 21 is an exploded perspective view of a piston assembly of the volume adjuster of FIG. 20.
Figure 22:
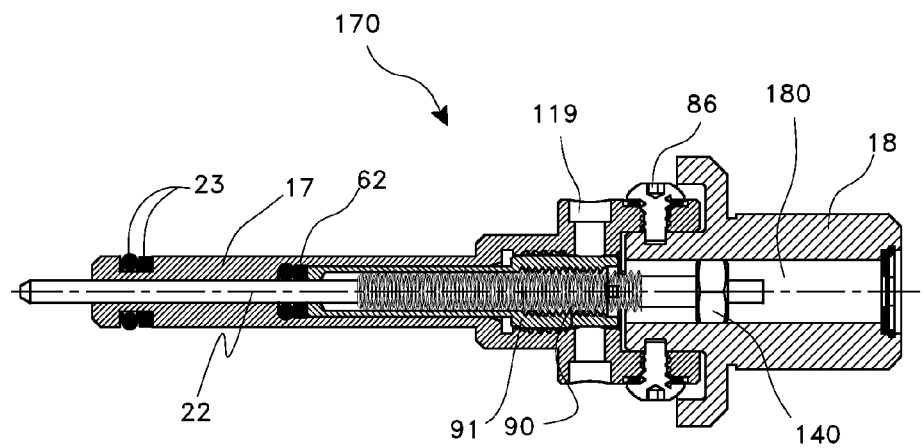
FIG. 22 is a cross-sectional view of the piston assembly of FIG. 21.

FIG. 21 illustrates an exploded perspective view of a piston assembly 170, which can include a primary piston 17 and a secondary piston 22. A secondary knob 18, which can control fine volume adjustment, can have a central bore 180 running through it. At least a portion of the bore can have a non-cylindrical shape, such that the secondary piston can be inserted into the bore and be rotationally locked relative to the secondary knob. For example, in the illustrated embodiment the bore 180 has a hexagonal cross-section, and the secondary piston 22 can include a hexagonal section 140 that can be configured to fit within the bore such that the secondary piston will not rotate relative to the secondary knob 18. A retaining ring and washer pair 44 can be attached to the back end of the secondary knob. The washer can be stainless steel, fiber, or of other materials. The retaining ring and washer pair can also serve as a mechanical stop for the secondary piston 22.

In some embodiments, the secondary piston 22 can be positioned within a hollow plunger 91. The plunger can have a section 191 of larger diameter and a section 193 of smaller diameter. Within the larger diameter section, a cylindrical insert 90 can be positioned between the secondary piston and an interior wall of the plunger in order to help insure smooth movement of the secondary piston. In some embodiments, the interior wall of the larger diameter section 191 of the plunger 91 and the insert 90 can be threaded such that the insert can screw into the plunger. The secondary piston 22 can also have a threaded section 142 which can screw into interior threads of the insert 90, such that the secondary piston, insert, and plunger are all threadedly connected. In some embodiments, the smaller diameter section 193 of the plunger can have internal threading which the threaded section of the secondary piston can screw directly into. In some embodiments, the device does not have an insert and the secondary piston can be configured to screw only into the plunger. Regardless of whether an insert is present, rotating the secondary knob 18 can rotate the piston 22, which moves it relative to the plunger.

Figure 23:
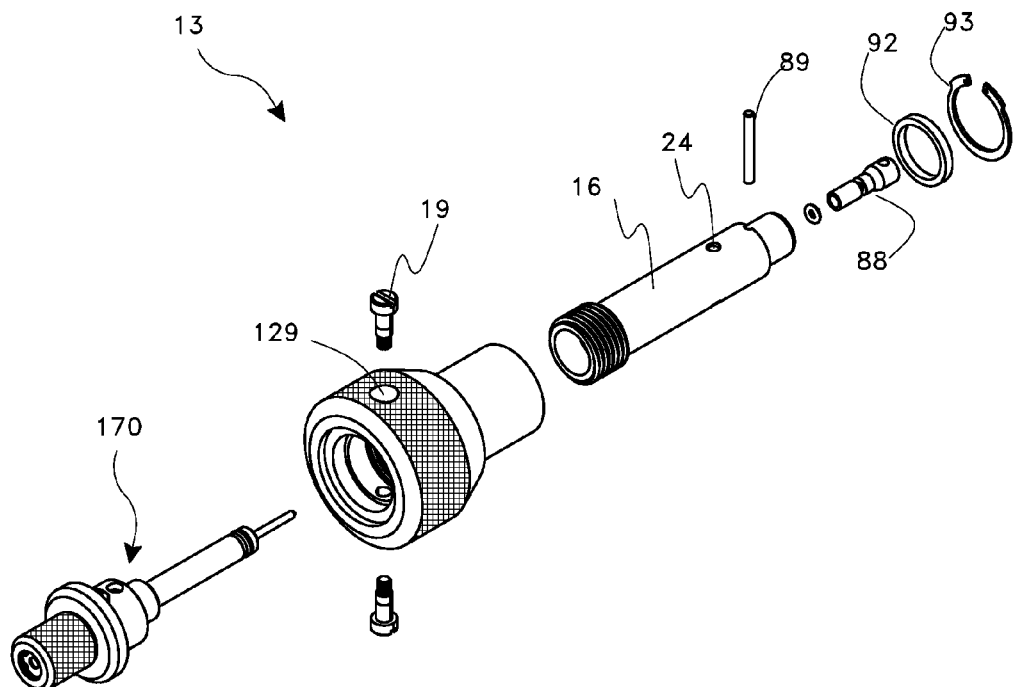
FIG. 23 is an exploded perspective view of the volume adjuster of FIG. 20.
Figure 24:
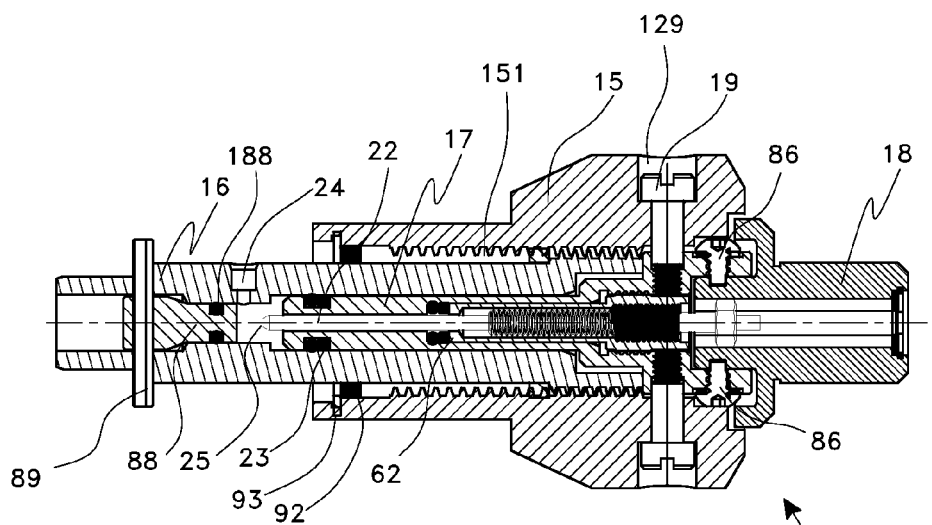
FIG. 24 is a cross-sectional view of the volume adjuster of FIG. 23.

The plunger 91 can be positioned within the primary piston 17. In some embodiments, the primary piston can have internal threads which can receive external threading 195 on the plunger. Retaining screws 86 can be used to axially lock the secondary knob 18 to the piston assembly. The primary piston can also have one or more holes 119, which can be used to connect it to a primary knob, as illustrated in FIGS. 23 and 24 below. An O-ring 62 (and in some embodiments one or more backup rings) can be positioned around the secondary piston 22 but within the primary piston 17 to help create a fluid seal. An O-ring 23 (and in some embodiments one or more backup O-rings) can also be mounted around a tip of the primary piston.

FIG. 23 illustrates an exploded perspective view of a volume adjuster 13, and FIG. 24 is a cross-sectional view of the volume adjuster. As illustrated, in addition to the piston assembly 170, the volume adjuster can include a primary knob 15 into which the piston assembly can be positioned. The piston assembly can be secured in place with pins or screws 19, which can pass through a hole 129 in the primary knob and the hole 119 of the primary piston 17. The piston assembly can also be positioned at least partially within a housing 16. The O-ring 23 can contact an interior surface of the housing to create a fluid seal between the housing and the primary piston 17.

In some embodiments, the housing 16 can have a section 160 with external threading and the primary knob 15 can have internal threading 151, allowing the two components to be screwed together. A ring 92 and a retaining ring 93 can be positioned around an end of the housing to provide a mechanical stop for motion of the knob relative to the housing.

A stop plug 88 can be used to seal an opening at one end of the housing 16, thereby forming a chamber 25 between the plug and the primary piston 17 and secondary piston 22. In some embodiments, a retaining pin 89 or other locking mechanism can be used to secure the plug to the housing. In some embodiments, one or more O-rings 188 can be positioned around a section of the stop plug to create a fluid seal between the stop plug and the housing.

As in previous embodiments, rotation of the primary knob 15 can cause the primary piston 17 to move relative to the housing, adjusting the volume in the chamber 25. In some embodiments, the threading can be designed such that the required torque to rotate various components is such that rotation of the primary knob causes both the primary and secondary pistons to move relative to the housing. In some embodiments, the threading can be configured such that rotation of the primary knob only causes the primary piston to move relative to the housing. Rotation of the secondary knob 18 can cause just the secondary piston 22 to move relative to the housing, leading to smaller volume adjustments within the chamber 25.

Check Valves

FIGS. 25A through 26B illustrate different check valve designs for use in a fluid calibration pressure device. The check valves can be positioned as described above, such as in a channel between a fluid chamber and a manifold, or within the piston or piston rod of a pump. Generally, check valves can be positioned anywhere in the device where flow is desired in only one direction.

Figure 25A:
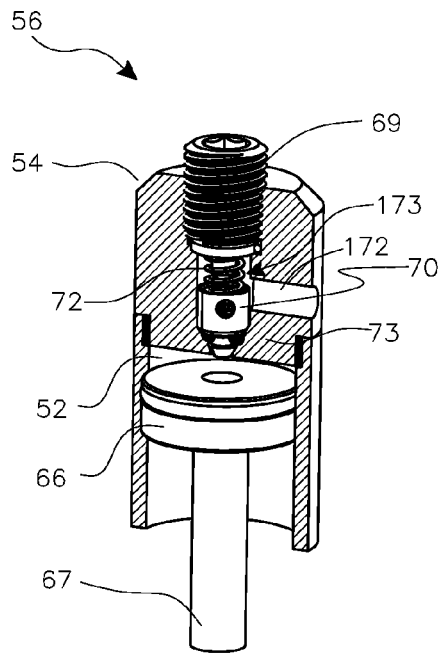
FIG. 25A is a perspective sectional view of one embodiment of a poppet type check valve.
Figure 25B:
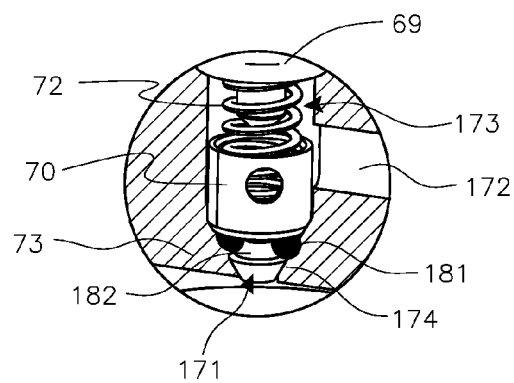
FIG. 25B is a detailed view of components of the check valve of FIG. 25A.
Figure 26A:
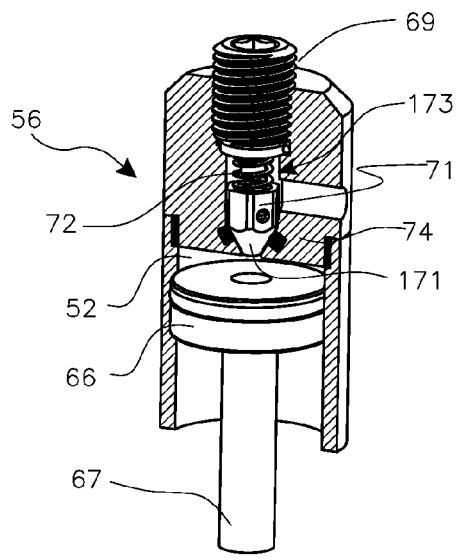
FIG. 26A is a perspective sectional view of one embodiment of a seat type check valve.
Figure 26B:
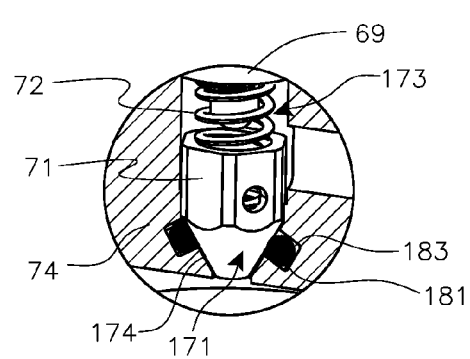
FIG. 26B is a detailed view of components of the check valve of FIG. 26A.

FIGS. 25A and 26A illustrate different embodiments of a check valve. FIGS. 25B and 26B illustrates detail views of a poppet 70 of FIGS. 25A and 26A, respectively. As described and illustrated with respect to FIG. 1, check valves can be positioned in various locations within a calibration pressure device, including within a piston 66 or piston rod 67, or between a fluid chamber 52 and a manifold 57 of the device (visible in FIG. 1). The embodiments described herein can be used for any check valve within a fluid calibration pressure device.

In some embodiments, a check valve 56 can include a check valve housing 73 with a cavity 173. In some embodiments, the cavity can be a bore with a central axis and a tapered end that can form a valve seat 174. A poppet 70 can be positioned concentrically within the cavity and be capable of movement along the central axis of the cavity. The poppet can have a first, tapered end 171 configured to fit within the valve seat 174. The tapered end can help allow a poppet to seal against the valve seat in low pressure conditions.

In some embodiments, as illustrated in FIGS. 25A and 25B, the poppet 70 can have a groove 182. In some embodiments the groove can be within the tapered end 171 of the poppet. An O-ring 181 can be mounted within the groove. In some embodiments, a biasing element 72, such as a spring, can attach to a second end of the poppet and bias the poppet against the valve seat 174. The O-ring can contact the valve seat and create a fluid seal, blocking or substantially blocking fluid flow through the check valve 56. This can block or substantially block fluid communication between the chamber 52 and the manifold (visible in FIG. 1). When the calibration device is pumped such that the piston 66 and piston rod 67 drive toward the check valve 56, the increased pressure can drive the poppet 70 away from the biasing element 72, breaking the seal between the O-ring 181 and the valve seat 174 and allowing fluid to flow past the poppet and out of a flow path or channel 172 of the check valve. The biasing element 72 can return the poppet to the valve seat 174 when enough fluid has flowed past for the pressure in the chamber 52 to diminish. A plug 69 can be used to maintain the biasing element in position and to seal the housing cavity 173. In some embodiments, the plug can be threaded. In some embodiments, the plug can have a distal end that has a reduced diameter that attaches to the biasing element 72.

Because the poppet 70 can move with every stroke of the piston 66, the O-ring can be subject to significant deformation as it moves between a position in which it seals against the valve seat 174 and a position in which it is not sealed. This can be especially true in high pressure conditions, such as during applications with pressures exceeding 3,000 psi. When using various embodiments described herein, operating pressures can exceed 10,000 psi.

FIGS. 26A and 26B illustrate an alternate embodiment of a check valve design for use in a fluid calibration pressure device. FIG. 26A illustrates a check valve 56 and FIG. 26B illustrates a detail view of a poppet 70 used in the check valve. The check valve can operate generally as described above, but in some embodiments the tapered end 171 of the poppet 71 does not have a groove but can instead be generally smooth. In some embodiments, the tapered end of the poppet can have a generally conical shape.

The valve seat 174 of the housing 74 can have a groove 183 within a wall of the valve seat, such as a circumferential groove extending around an entire circumference of the valve seat. An O-ring 181 can be positioned within the groove. In some embodiments, at least a portion of the O-ring can extend from the groove past the wall of the valve seat. This portion of the O-ring can seal against the surface of the tapered end 171 of the poppet 71, creating a fluid seal between the poppet and the housing 74, as described above.

Because the groove is within the housing 74, it can be much larger than a groove within the poppet itself. This allows for use of an O-ring 181 with a larger diameter without changing the size of the poppet. For example, in some embodiments, the design discussed with respect to FIG. 25A can use a size 006 O-ring. In some embodiments, the design discussed with respect to FIG. 26A can use a size 008 O-ring, even if it uses the same sized poppet. The use of a larger O-ring allows for a lower volumetric material deformation of the O-ring during use, which can lead to a longer mean time between failures (MTBF) for the O-ring as compared to the previous embodiment. For example, changing from a size 006 to a size 008 O-ring can decrease volumetric compression from approximately 13.4% to approximately 6.6%, a reduction of approximately 50%.

Additionally, by positioning the O-ring within the housing and not a groove on the poppet itself, the O-ring can be increased in size not just according to diameter but also or alternatively according to its cross-sectional area. Thus, larger and more robust O-rings can be used that can greatly diminish the volumetric material deformation of the O-rings during use and lead to a longer MTBF.

Component Relationships

One advantage of the various subassemblies described herein (e.g., the PRV and bleed valve combination, the selector valve, and the volume adjuster) is that they can easily be modified for use as modular field replaceable units. For example, the subassemblies can have housings that are capable of being inserted into a fluid calibration pressure device and locked in place, such as with a quarter turn mechanism. This can enable repair and preparation of the device for different applications in minimal time. It is also possible to use various types of pumps in a calibration device, such as an electrically actuated pump, in place of the handle and lever mechanism described above. An electrically actuated pump can either replace or be incorporated within the handle mechanism.

The subassemblies of a fluid calibration device can be positioned anywhere in the pump and in any order so long as fluid communication exists between the components and the manifold. Since ergonomic considerations are an important part of hand pump design, the desired placement of knobs can determine the location of the components. Also, some functions can be separated. For example, the bleed valve can be independent of the pressure release valve and/or be combined with other subassemblies, such as the volume adjuster.

Additionally, various subassemblies can be used in other devices that require the features they provide. For example, the volume adjuster can be used in any device that requires volume adjustment of both pneumatic and hydraulic applications, or in any device that requires both coarse and fine volume adjustments. Similarly, the bleed valve and slip clutch knob can be used in other pneumatic or hydraulic instruments that use "micro metering" valves, whether stationary or portable. Additionally, various subassemblies can be used to replace and improve subassemblies in existing pumps.

The housings used in the subassemblies and in the fluid calibration pressure device itself are preferably formed of a durable, lightweight material. For example, in some embodiments one or more housings can be made of aluminum. The housings can also be plated with a coating to alter the properties of the material selected. For example, in some embodiments the housings can be covered with a corrosion resistant anodic coating such as Magnaplate HCR, which can also provide lubricity and surface hardness.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

Similarly, this method of disclosure is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

The following is claimed:

1. A portable calibration pressure device configured to generate vacuum and pressure, said calibration pressure device comprising:
   a pump having an inlet and an outlet;
   a manifold fluidly connected to the pump;
   a reservoir fluidly connected to the pump; and
   a selector valve configured for operation at pressures up at about 10,000 psi, the selector valve comprising:
      a selector valve housing comprising a plurality of ports;
      a spool positioned at least partially within the selector valve housing and configured to move axially within the selector valve housing from a first position to a second position, the spool comprising at least two recessed sections;

a plurality of spacer bushings positioned within the selector valve housing, wherein each port is adjacent a spacer bushing and the spacer bushings adjacent each port comprise at least one radial hole;

a plurality of sealing elements, at least one sealing element positioned between adjacent spacer bushings, the plurality of sealing elements configured to seal against an outer diameter of the spool;

a first fluid volume between a first recessed section of the spool and interior surfaces of the sealing elements and spacer bushings;

a second fluid volume between a second recessed section of the spool and interior surfaces of the sealing elements and spacer bushings; and a cam unit configured to be grasped and rotated by a user, the cam unit comprising a notch that receives a pin that is rigidly connected with the spool, wherein the rotation of the cam unit moves the pin which in turn moves the spool within the selector valve housing;

the selector valve configured such that:
when the spool is in the first position, the reservoir fluidly communicates through one of the first and second fluid volume to the pump inlet and the manifold fluidly communicates through the other of the first and second fluid volume to the pump outlet, and when the spool is in the second position, the reservoir fluidly communicates through one of the first and second fluid volume to the pump outlet and the manifold fluidly communicates through the other of the first and second fluid volume to the pump inlet.

2. The calibration pressure device of claim 1, wherein the pump is a hand pump.

3. The calibration pressure device of claim 1, wherein the spool is configured to have a third position between the first position and the second position such that when the spool is in the third position the reservoir fluidly communicates through one of the first and second fluid volume with the manifold.

4. The calibration pressure device of claim 1, wherein rotating the cam unit causes the spool to move axially within the selector valve housing.

5. The calibration pressure device of claim 1, wherein the cam unit comprises an angled slot configured to receive a pin that connects to the spool.

6. The calibration pressure device of claim 4, wherein the cam unit rotates no more than 360 degrees to move the spool axially from the first position to the second position.

7. The calibration pressure device of claim 6, wherein the cam unit rotates 120 degrees during movement of the spool axially from the first position to the second position.

8. The calibration pressure device of claim 1, wherein the spacer bushings adjacent each port comprise at least one radial hole aligned with the port.

9. The calibration pressure device of claim 1, wherein the plurality of sealing elements remain stationary relative to the selector valve housing when the spool moves from the first position to the second position.

10. The calibration pressure device of claim 1, wherein a first port in the selector valve housing fluidly connects to the pump inlet and a second port in the selector valve housing fluidly connects to the pump outlet.

11. The calibration pressure device of claim 10, wherein when the spool is in the first position, a third port is in fluid communication with the reservoir and is in fluid communication through the first fluid volume with the first port, and a fourth port is in fluid communication with the manifold and is in fluid communication through the second fluid volume with the second port.

12. The calibration pressure device of claim 11, wherein when the spool is in the second position, a fifth port is in fluid communication with the reservoir and is in fluid communication through the second fluid volume with the second port, and the fourth port is in fluid communication with the manifold and is in fluid communication through the first fluid volume with the first port.

13. The calibration pressure device of claim 1, wherein the cam unit further comprises a knob.

14. A portable calibration pressure device configured to generate vacuum and pressure, said calibration pressure device comprising:

a pump having an inlet and an outlet;
a manifold fluidly connected to the pump;
a reservoir fluidly connected to the pump; and
a selector valve configured for operation at pressures up at about 10,000 psi, the selector valve comprising:
a selector valve housing comprising a plurality of ports;
a spool positioned at least partially within the selector valve housing and configured to move axially within the selector valve housing from a first position to a second position, the spool comprising a first recessed section and a second recessed section;

the first recessed section comprising a first tapered portion, a second tapered portion, and an intermediate portion, the intermediate portion being located longitudinally between the first and second tapered portions, the intermediate portion comprising a generally constant diameter;

the first tapered portion and the intermediate portion each having a longitudinal length, the longitudinal length of the first tapered portion being greater than the longitudinal length of the intermediate portion;

a plurality of spacer bushings positioned within the selector valve housing, wherein each port is adjacent a spacer bushing and the spacer bushings adjacent each port comprise at least one radial hole;

a plurality of sealing elements, at least one sealing element positioned between adjacent spacer bushings, the plurality of sealing elements configured to seal against an outer diameter of the spool;

a first fluid volume between a first recessed section of the spool and interior surfaces of the sealing elements and spacer bushings;

a second fluid volume between a second recessed section of the spool and interior surfaces of the sealing elements and spacer bushings; and a cam unit configured to be grasped and rotated by a user, the cam unit comprising a notch that receives a pin that is rigidly connected with the spool, wherein the rotation of the cam unit moves the pin which in turn moves the spool within the selector valve housing;

the selector valve configured such that:
when the spool is in the first position, the reservoir fluidly communicates through one of the first and second fluid volume to the pump inlet and the manifold fluidly communicates through the other of the first and second fluid volume to the pump outlet, and when the spool is in the second position, the reservoir fluidly communicates through one of the first and second fluid volume to the pump outlet and the manifold fluidly communicates through the other of the first and second fluid volume to the pump inlet.

15. The calibration pressure device of claim 14, wherein the second tapered portion has a longitudinal length that is greater than the longitudinal length of the intermediate portion.

16. The calibration pressure device of claim 15, wherein the longitudinal length of the second tapered portion is about equal to the longitudinal length of the first tapered portion.

17. The calibration pressure device of claim 14, wherein the cam unit comprises an angled slot configured to receive a pin that connects to the spool.

18. The calibration pressure device of claim 14, wherein the cam unit rotates no more than 360 degrees to move the spool axially from the first position to the second position.

19. The calibration pressure device of claim 18, wherein the cam unit rotates 120 degrees during movement of the spool axially from the first position to the second position.

20. The calibration pressure device of claim 14, wherein the sealing elements comprise resilient O-rings with circular cross-sections.

21. The calibration pressure device of claim 14, wherein the plurality of sealing elements remain stationary relative to the selector valve housing when the spool moves from the first position to the second position.

22. The calibration pressure device of claim 14, wherein the taper of the first tapered portion is substantially constant.

23. The calibration pressure device of claim 14, wherein the pump comprises a hand pump.

24. The calibration pressure device of claim 14, wherein the spool is configured to have a third position between the first position and the second position such that when the spool is in the third position the reservoir fluidly communicates through one of the first and second fluid volume with the manifold.

25. A portable calibration pressure device configured to generate vacuum and pressure, said calibration pressure device comprising:
   a pump having an inlet and an outlet;
   a manifold fluidly connected to the pump;
   a reservoir fluidly connected to the pump; and
   a selector valve configured for operation at pressures up at about 10,000 psi, the selector valve comprising:
      a selector valve housing comprising a plurality of ports;
      a spool positioned at least partially within the selector valve housing and configured to move axially within the selector valve housing from a first position to a second position, the spool comprising a first recessed section and a second recessed section;
      the first recessed section comprising a first tapered portion, a second tapered portion, and an intermediate portion, the intermediate portion being located longitudinally between the first and second tapered portions;
      the first tapered portion tapering from a first diameter to a second diameter, the first diameter being greater than the second diameter;
      the first tapered portion having a longitudinal length that is greater than the first diameter of the first tapered portion;
      a plurality of spacer bushings positioned within the selector valve housing, wherein each port is adjacent a spacer bushing and the spacer bushings adjacent each port comprise at least one radial hole;
      a plurality of sealing elements, at least one sealing element positioned between adjacent spacer bushings, the plurality of sealing elements configured to seal against an outer diameter of the spool;
      a first fluid volume between a first recessed section of the spool and interior surfaces of the sealing elements and spacer bushings;
      a second fluid volume between a second recessed section of the spool and interior surfaces of the sealing elements and spacer bushings; and
      a cam unit configured to be grasped and rotated by a user, the cam unit comprising a notch that receives a pin that is rigidly connected with the spool, wherein the rotation of the cam unit moves the pin which in turn moves the spool within the selector valve housing;
   the selector valve configured such that:
      when the spool is in the first position, the reservoir fluidly communicates through one of the first and second fluid volume to the pump inlet and the manifold fluidly communicates through the other of the first and second fluid volume to the pump outlet, and
      when the spool is in the second position, the reservoir fluidly communicates through one of the first and second fluid volume to the pump outlet and the manifold fluidly communicates through the other of the first and second fluid volume to the pump inlet.

26. The calibration pressure device of claim 25, wherein the intermediate portion comprises a diameter that is less than the first diameter of the first tapered portion.

27. The calibration pressure device of claim 25, wherein the intermediate portion comprises a diameter that is about equal to the second diameter of the first tapered portion.

28. The calibration pressure device of claim 25, wherein the first tapered portion and the intermediate portion each have a longitudinal length, the longitudinal length of the first tapered portion being greater than the longitudinal length of the intermediate portion.

29. The calibration pressure device of claim 25, wherein the cam unit comprises an angled slot configured to receive a pin that connects to the spool.

30. The calibration pressure device of claim 25, wherein the cam unit rotates no more than 360 degrees to move the spool axially from the first position to the second position.

31. The calibration pressure device of claim 30, wherein the cam unit rotates 120 degrees during movement of the spool axially from the first position to the second position.

32. The calibration pressure device of claim 25, wherein the sealing elements comprise resilient O-rings with circular cross-sections.

33. The calibration pressure device of claim 25, wherein the plurality of sealing elements remain stationary relative to the selector valve housing when the spool moves from the first position to the second position.

34. The calibration pressure device of claim 25, wherein the pump comprises a hand pump.

35. The calibration pressure device of claim 25, wherein the spool is configured to have a third position between the first position and the second position such that when the spool is in the third position the reservoir fluidly communicates through one of the first and second fluid volume with the manifold.

* * * * *